(12) United States Patent
Huang et al.

(10) Patent No.: US 12,451,947 B2
(45) Date of Patent: Oct. 21, 2025

(54) BORESIGHT DIRECTION ALIGNMENT BASED ON REFERENCE SIGNAL TRANSMISSION AND RECEPTION

(71) Applicant: QUALCOMM Incorporated, San Diego, CA (US)

(72) Inventors: Min Huang, Beijing (CN); Chao Wei, Beijing (CN); Hao Xu, Beijing (CN); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/709,875

(22) PCT Filed: Jan. 27, 2022

(86) PCT No.: PCT/CN2022/074160
§ 371 (c)(1),
(2) Date: May 14, 2024

(87) PCT Pub. No.: WO2023/141848
PCT Pub. Date: Aug. 3, 2023

(65) Prior Publication Data
US 2025/0023616 A1 Jan. 16, 2025

(51) Int. Cl.
*H04B 7/0413* (2017.01)
*H04B 7/06* (2006.01)
*H04L 5/00* (2006.01)
*H04L 27/26* (2006.01)

(52) U.S. Cl.
CPC ......... *H04B 7/0691* (2013.01); *H04B 7/0413* (2013.01); *H04L 5/0048* (2013.01); *H04L 27/2639* (2013.01); *H04L 27/2697* (2013.01)

(58) Field of Classification Search
CPC ... H04B 7/0691; H04B 7/0413; H04L 5/0048; H04L 27/2639; H04L 27/2697
See application file for complete search history.

(56) References Cited

U.S. PATENT DOCUMENTS

2021/0341599 A1* 11/2021 Rozewicz ............. G01S 13/931

FOREIGN PATENT DOCUMENTS

| CN | 103986531 A | 8/2014 |
|---|---|---|
| CN | 113765550 A | 12/2021 |
| JP | 2019062297 A | 4/2019 |
| WO | WO-2022000400 | 1/2022 |

OTHER PUBLICATIONS

International Search Report and Written Opinion—PCT/CN2022/074160—ISA/EPO—Oct. 19, 2022.

* cited by examiner

*Primary Examiner* — Rahel Guarino
(74) *Attorney, Agent, or Firm* — QUALCOMM Incorporated

(57) ABSTRACT

Various aspects of the present disclosure generally relate to wireless communication. In some aspects, a first orbital angular momentum (OAM) node may transmit a boresight direction alignment reference signal to a second OAM node. The first OAM node may receive, from the second OAM node, a boresight direction alignment status report that indicates boresight direction alignment information based at least in part on the boresight direction alignment reference signal. Numerous other aspects are described.

30 Claims, 10 Drawing Sheets

BORESIGHT DIRECTION ALIGNMENT BASED ON REFERENCE SIGNAL TRANSMISSION AND RECEPTION

CROSS-REFERENCE TO RELATED APPLICATION

This Patent Application is a 371 national stage of PCT Application No. PCT/CN2022/074160 filed on Jan. 27, 2022, entitled "BORESIGHT DIRECTION ALIGNMENT BASED ON REFERENCE SIGNAL TRANSMISSION AND RECEPTION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for boresight direction alignment based on reference signal transmission and reception.

BACKGROUND

Wireless communication systems are widely deployed to provide various telecommunication services such as telephony, video, data, messaging, and broadcasts.

Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a first orbital angular momentum (OAM) node for OAM multiplexing based communication. The first OAM node may include a memory and one or more processors coupled to the memory. The one or more processors may be configured to transmit a boresight direction alignment reference signal to a second OAM node. The one or more processors may be configured to receive, from the second OAM node, a boresight direction alignment status report that indicates boresight direction alignment information based at least in part on the boresight direction alignment reference signal.

Some aspects described herein relate to a second OAM node. The second OAM node, of a first OAM node and the second OAM node, may include a memory and one or more processors coupled to the memory. The one or more processors may be configured to receive a boresight direction alignment reference signal from the first OAM node. The one or more processors may be configured to transmit, to the first OAM node, a boresight direction alignment status report that indicates boresight direction alignment information based at least in part on the boresight direction alignment reference signal.

Some aspects described herein relate to a method of OAM multiplexing based communication performed by a first OAM node. The method may include transmitting a boresight direction alignment reference signal to a second OAM node. The method may include receiving, from the second OAM node, a boresight direction alignment status report that indicates boresight direction alignment information based at least in part on the boresight direction alignment reference signal.

Some aspects described herein relate to a method of OAM multiplexing based communication associated with a first OAM node and a second OAM node. The method may include receiving a boresight direction alignment reference signal from the first OAM node. The method may include transmitting, to the first OAM node, a boresight direction alignment status report that indicates boresight direction alignment information based at least in part on the boresight direction alignment reference signal.

Some aspects described herein relate to a non-transitory computer-readable medium that stores a set of instructions for wireless communication by a first OAM node. The set of instructions, when executed by one or more processors of the OAM, may cause the OAM to transmit a boresight direction alignment reference signal to a second OAM node. The set of instructions, when executed by one or more processors of the OAM, may cause the OAM to receive, from the second OAM node, a boresight direction alignment status report that indicates boresight direction alignment information based at least in part on the boresight direction alignment reference signal.

Some aspects described herein relate to a non-transitory computer-readable medium that stores a set of instructions for wireless communication by a second OAM node of a first OA node and a second OAM node. The set of instructions, when executed by one or more processors of the second OAM node, may cause the second OAM node to receive a boresight direction alignment reference signal from the first OAM node. The set of instructions, when executed by one or more processors of the second OAM node, may cause the second OAM node to transmit, to the first OAM node, a boresight direction alignment status report that indicates boresight direction alignment information based at least in part on the boresight direction alignment reference signal.

Some aspects described herein relate to an apparatus for wireless communication. The apparatus may include means for transmitting a boresight direction alignment reference signal to an OAM node. The apparatus may include means for receiving, from the OAM node, a boresight direction alignment status report that indicates boresight direction alignment information based at least in part on the boresight direction alignment reference signal.

Some aspects described herein relate to an apparatus for wireless communication. The apparatus may include means for receiving a boresight direction alignment reference signal from an OAM node. The apparatus may include means for transmitting, to the OAM node, a boresight direction alignment status report that indicates boresight direction alignment information based at least in part on the boresight direction alignment reference signal.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
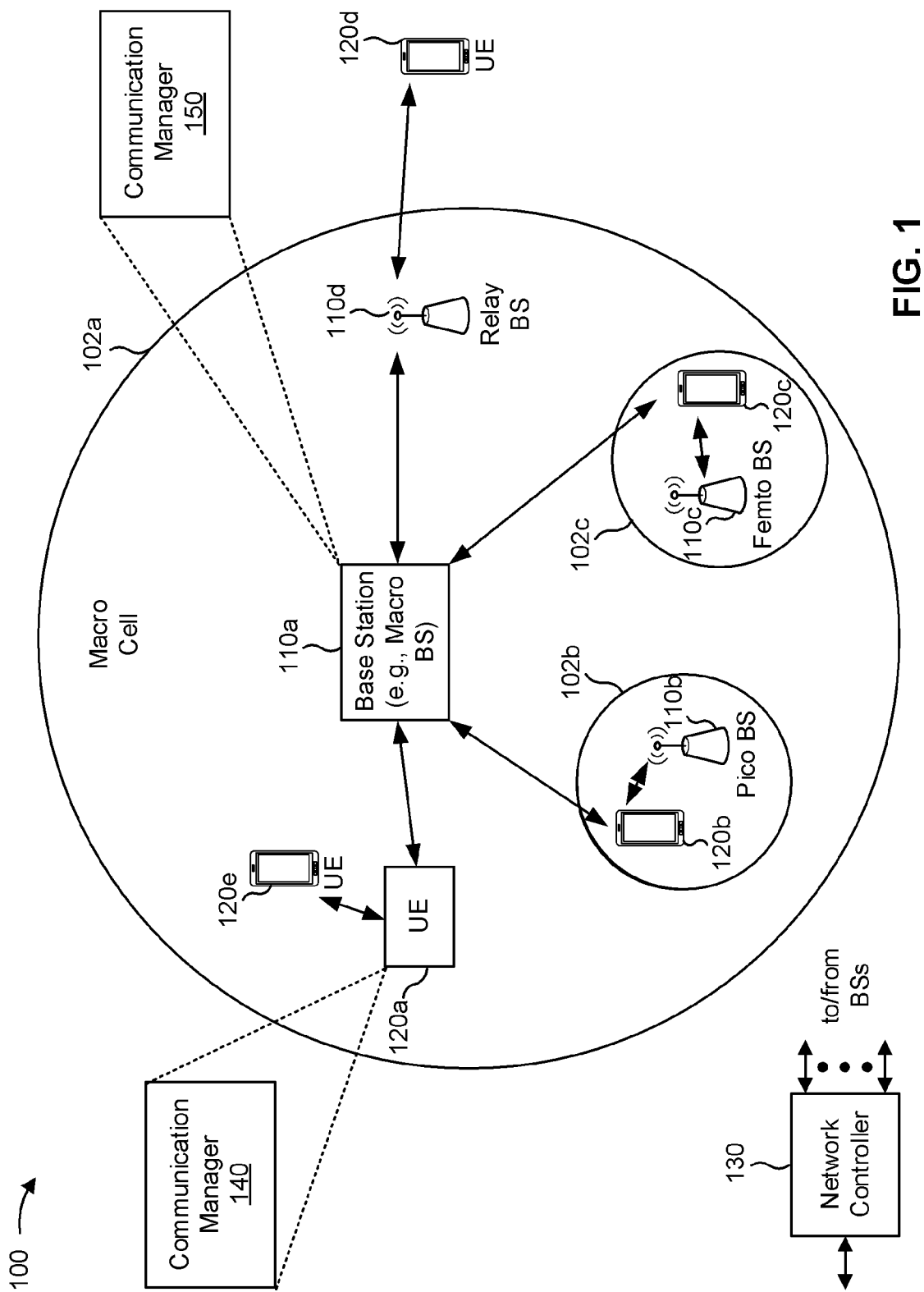
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As described herein, a network node, which may be referred to as an "orbital angular momentum (OAM) node," a "node," or a "wireless node," may be a base station (e.g., base station 110), a UE (e.g., UE 120), a relay device, a network controller, an apparatus, a device, a computing system, one or more components of any of these, and/or another processing entity configured to perform one or more aspects of the techniques described herein. For example, a network node may be a UE. As another example, a network node may be a base station. A network node may be an aggregated base station and/or one or more components of a disaggregated base station. As an example, a first network node may be configured to communicate with a second network node or a third network node. The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. Reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses a first network node being configured to receive information from a second network node, "first network node" may refer to a first UE, a first base station, a first apparatus, a first device, a first computing system, a first one or more components, a first processing entity, or the like configured to receive the information from the second network; and "second network node" may refer to a second UE, a second base station, a second apparatus, a second device, a second computing system, a second one or more components, a second processing entity, or the like.

In some aspects, a first orbital angular momentum (OAM) node may include a communication manager 140 or 150. As described in more detail elsewhere herein, the communication manager 140 or 150 may transmit a boresight direction alignment reference signal to a second OAM node; and receive, from the second OAM node, a boresight direction alignment status report that indicates boresight direction alignment information based at least in part on the boresight direction alignment reference signal. Additionally, or alternatively, the communication manager 140 or 150 may perform one or more other operations described herein.

In some aspects, the second OAM node may include a communication manager 140 or 150. As described in more detail elsewhere herein, the communication manager 140 or 150 may receive a boresight direction alignment reference signal from the first OAM node; and transmit, to the first OAM node, a boresight direction alignment status report that indicates boresight direction alignment information based at least in part on the boresight direction alignment reference signal. Additionally, or alternatively, the communication manager 140 or 150 may perform one or more other operations described herein.

As indicated above, FIG. 1 is provided as an example. Other examples may differ from what is described with regard to FIG. 1.

Figure 2:
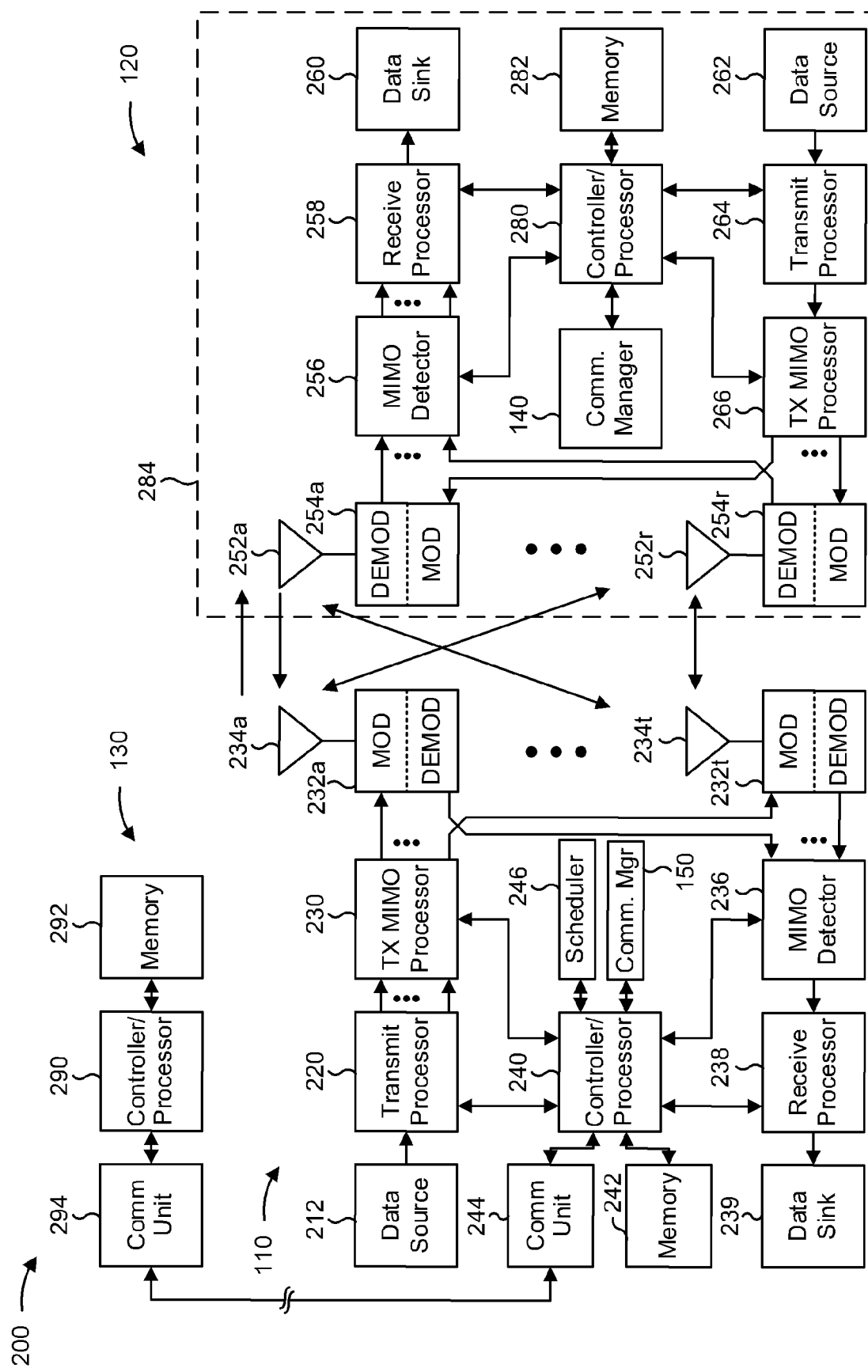
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

In some aspects, the term "base station" (e.g., the base station 110) may refer to an aggregated base station, a disaggregated base station, and/or one or more components of a disaggregated base station. For example, in some aspects, "base station" may refer to a control unit, a distributed unit, a plurality of control units, a plurality of distributed units, and/or a combination thereof. In some aspects, "base station" may refer to one device configured to perform one or more functions such as those described above in connection with the base station 110. In some aspects, "base station" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" may refer to any one or more of those different devices. In some aspects, "base station" may refer to one or more virtual base stations, one or more virtual base station functions, and/or a combination of thereof. For example, in some cases, two or more base station functions may be instantiated on a single device. In some aspects, "base station" may refer to one of the base station functions and not another. In this way, a single device may include more than one base station.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with boresight direction alignment based on reference signal transmission and reception for OAM nodes, as described in more detail elsewhere herein. In some aspects, the OAM node described herein is the base station 110, is included in the base station 110, or includes one or more components of the base station 110 shown in FIG. 2. In some aspects, the OAM node described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the first OAM node includes means for transmitting a boresight direction alignment reference signal to a second OAM node; and/or means for receiving, from the second OAM node, a boresight direction alignment status report that indicates boresight direction alignment information based at least in part on the boresight direction alignment reference signal. In some aspects, the means for the first OAM node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the first OAM node to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the second OAM node includes means for receiving a boresight direction alignment reference signal from the first OAM node; and/or means for transmitting, to the first OAM node, a boresight direction alignment status report that indicates boresight direction alignment information based at least in part on the boresight direction alignment reference signal. In some aspects, the means for the second OAM node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the second OAM node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
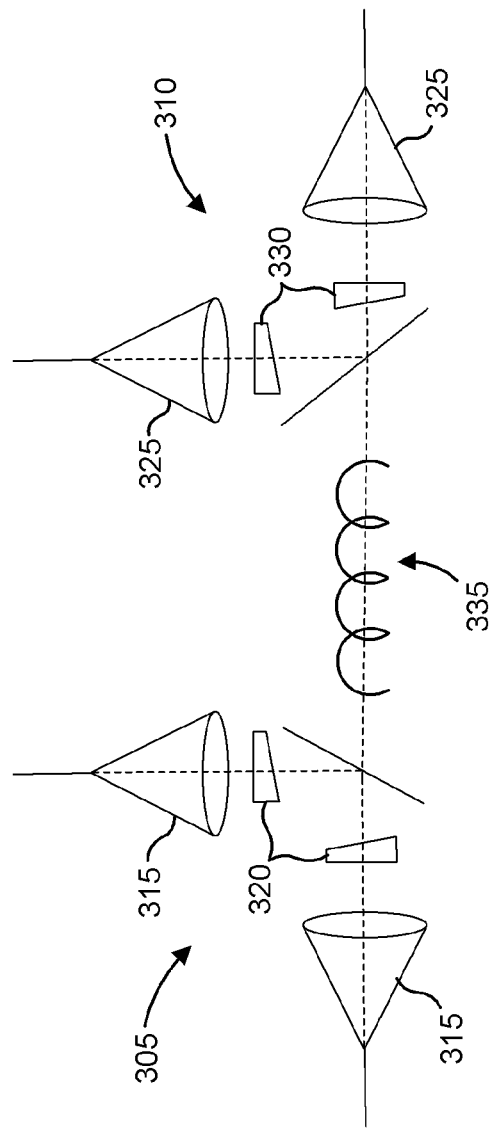
FIG. 3 is a diagram illustrating an example of multi-aperture orbital angular momentum (OAM) multiplexing based communication, in accordance with the present disclosure.

FIG. 3 is a diagram illustrating an example 300 of multi-aperture OAM multiplexing based communication, in accordance with the present disclosure. As shown, an OAM transmitter 305 and an OAM receiver 310 may communicate with one another using OAM multiplexing based communication. According to various aspects, the OAM transmitter 305 and/or the OAM receiver 310 may be implemented in connection with one or more UEs (e.g., the UE 120 shown in FIG. 1, and/or the like), one or more base stations (e.g., the base station 110 shown in FIG. 1, and/or the like), one or more vehicles having one or more onboard UEs, and/or the like.

As shown, the OAM transmitter 305 may include a number of transmitter apertures 315 and a number of corresponding transmitter spiral phase plates (SPPs) 320. The OAM receiver 310 may include a number of receiver apertures 325 and a number of corresponding receiver SPPs 330. Each transmitter aperture 315 may transmit a wave of one OAM mode. Each wave may be modulated by a corresponding transmitter SPP 320 to create a spiral wave 335. In some aspects, each SPP may be referred to as a transmitter circle (or receiver circle) due to the circular nature of cross sections of the spiral wave emitted.

Each receiver aperture 325 may receive the wave 335 transmitted by a corresponding OAM transmitter 305. The wave 335 may be demodulated by a corresponding receiver SPP 330 to convert the spiral wave into a toroidal wave that is received by the corresponding receiver aperture 325. Due to mutual orthogonality among OAM modes (e.g., orthogonality between each pair of OAM modes of a set of OAM nodes), the wave 335 of one OAM mode may not be received by a receiver aperture 325 corresponding to the other OAM mode.

As indicated above, FIG. 3 is provided as an example. Other examples may differ from what is described with regard to FIG. 3.

Figure 4:
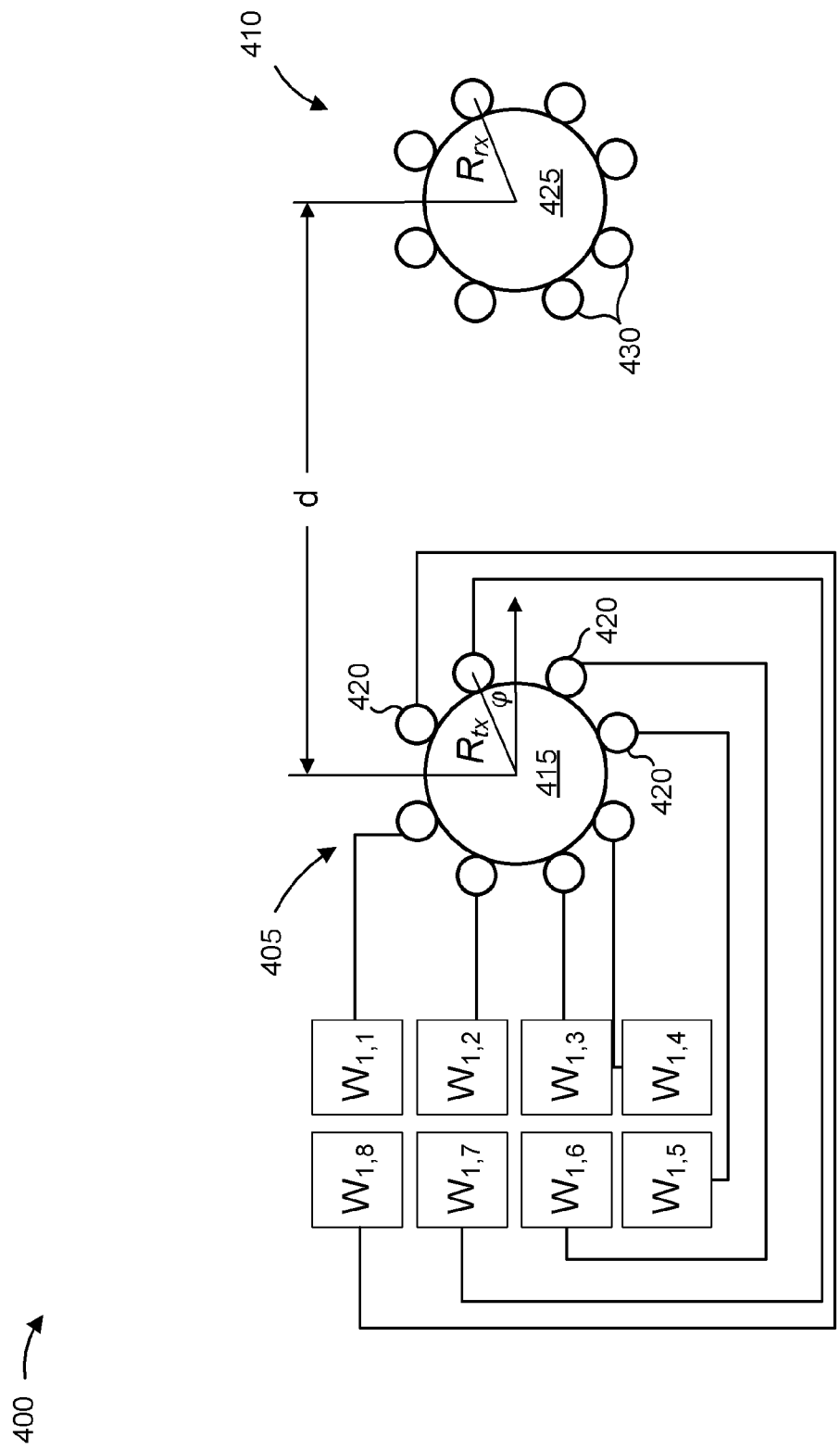
FIG. 4 is a diagram illustrating an example of OAM multiplexing based communication using uniform circular array (UCA) antennas, in accordance with the present disclosure.

FIG. 4 is a diagram illustrating an example 400 of OAM multiplexing based communication using uniform circular array (UCA) antennas, in accordance with the present disclosure. As shown, an OAM transmitter 405 and an OAM receiver 410 may communicate with one another using OAM multiplexing based communication. In some cases, the OAM transmitter 405 and/or the OAM receiver 410 may be implemented in connection with one or more UEs (e.g., the UE 120 shown in FIG. 1, and/or the like), one or more base stations (e.g., the base station 110 shown in FIG. 1, and/or the like), one or more vehicles having one or more onboard UEs, and/or the like.

As shown, the OAM transmitter 405 includes a UCA 415 having a plurality of OAM antennas 420 configured in a circle (or an at least approximately circular shape). In this regard, a UCA 415 may be referred to as a transmitter circle (or receiver circle). Similarly, the OAM receiver 410 includes a UCA 425 having a plurality of OAM antennas 430 equipped in a circle (or an at least approximately circular shape). By multiplying respective beamforming weights $w_i = [w_{i,1}\ w_{i,2}, \ldots, w_{i,8}]^T$ onto each antenna, the OAM transmitter 405 may generate a signal port. If the weight of each antenna 420 is equal to $\exp(i\varphi l)$, where $\varphi$ is the angle of antenna in the circle, l is the OAM mode order, then the beamformed port may be an equivalent OAM mode l. By using different beamforming weights $\exp(i\varphi l')$, where $l' \neq l$, the transmitter 405 may generate multiple OAM modes.

For a channel matrix, H, from each transmit antenna 420 to each receive antenna 430, the beamformed channel matrix $\tilde{H} = H \cdot [w_1, w_2, \ldots, w_L]$, and any two columns of $\tilde{H}$ are orthogonal. Thus, the beamformed ports have no crosstalk. As a result, UCA OAM-based communication may realize high-level spatial multiplexing degree efficiently.

As explained above, OAM communications may use SPP or UCA antennas to transmit multiple orthogonal signals with different OAM modes. SPP-based OAM generates continuous spiral waves, and thus can form an unlimited number of orthogonal OAM modes in theory. But in practice, due to propagation divergence and one mode per SPP, the number of effective OAM modes is limited (e.g., four modes). UCA-based OAM generates discrete spiral waves, and thus can form as many OAM modes as there are transmitter antennas. UCA-based OAM may be considered to be a form of MIMO whose eigen-based transmission precoding weights and reception combining weights are constantly equal to a discrete Fourier transform matrix, which is unaffected by communication parameters (e.g., distance, aperture size and carrier frequency) and thus can be implemented at low cost.

As indicated above, FIG. 4 is provided as an example. Other examples may differ from what is described with regard to FIG. 4.

Figure 5:
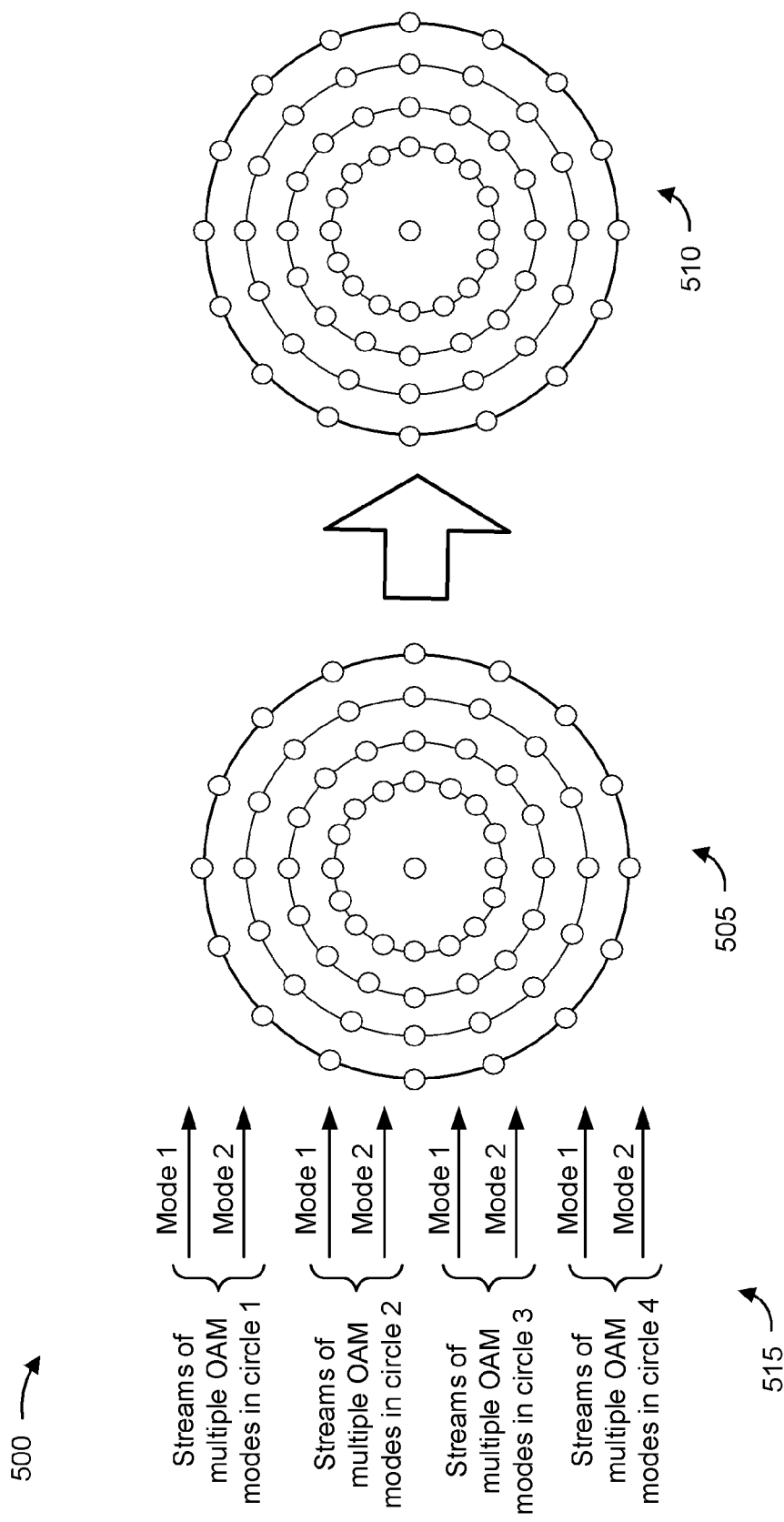
FIG. 5 is a diagram illustrating an example associated with co-axial multi-circle OAM multiplexing based communication, in accordance with the present disclosure.

FIG. 5 is a diagram illustrating an example 500 associated with co-axial multi-circle OAM multiplexing based communication, in accordance with the present disclosure. "Multi-circle OAM multiplexing based communication" may refer to communication between an OAM transmitter 505 and an OAM receiver 510. Multiple co-axial UCA antenna circles and/or multiple co-axial SPP-based apertures may be implemented at the OAM transmitter 505 and the OAM receiver 510.

As shown by reference number 515, a number of data streams of different OAM modes may be transmitted using each circle of the multi-circle OAM transmitter 505. For example, as shown, a first data stream of each circle may be transmitted using a first OAM mode ("Mode 1"), and a second data stream of each circle may be transmitted using a second OAM mode ("Mode 2"). In some aspects, the intra-circle streams may be orthogonal. The inter-circle streams may be orthogonal with different OAM modes or non-orthogonal with the same OAM mode. For each OAM mode, there may be inter-circle interferences. For example, a stream transmitted from one circle using Mode 1 may mutually interfere with a stream transmitted from another circle using Mode 1.

As indicated above, FIG. 5 is provided as an example. Other examples may differ from what is described with regard to FIG. 5.

In some cases, a boresight direction alignment between a first OAM antenna panel (which may be referred to herein as an antenna array) and a second OAM antenna panel can change (e.g., due to vibration or infrastructure movement), resulting in boresight direction misalignment. Throughout this disclosure, for clarity of description, in the context of a boresight direction and/or a boresight direction alignment, a first OAM antenna panel may be referred to as a first OAM node and a second OAM antenna panel may be referred to as a second OAM node, although "first OAM node" and "second OAM node" also may refer to a first apparatus and a second apparatus with which the first antenna panel and the second antenna panel are respectively associated. An OAM node may include more than one antenna panel, each of which may include a corresponding boresight direction. In some aspects, a boresight direction of an OAM node may be associated with more than one antenna panel when the antenna panels transmit or receive signals in a same direction. In some aspects, "boresight direction" of an OAM node may refer to a central direction and/or a vector average of a number of different transmission and/or reception directions.

"Boresight between a first OAM node and a second OAM node" refers to a directional alignment of an antenna panel of the first OAM node with an antenna panel of the second OAM node. For example, a first OAM node and a second OAM node may be in boresight direction alignment when an intersection angle of a boresight direction of the first OAM node and a boresight direction of the second OAM node is at least approximately zero. In the context of this disclosure, an intersection angle (and/or any other angle discussed herein) is at least approximately zero when the angle is equal to zero or equal to a value such that a difference between the value and zero is sufficiently small that any resulting change in performance is within a specified tolerance.

A first OAM node and a second OAM node may be in boresight misalignment when an intersection angle of a boresight direction of the first OAM node and a boresight direction of the second OAM node is greater than at least approximately zero. In the context of this disclosure, an intersection angle (and/or any other angle discussed herein) is "greater than at least approximately zero" when the angle is equal to a value such that a difference between the value and zero is sufficiently large that any resulting change in performance is not within a specified tolerance.

In some cases, boresight direction misalignment can cause an increase in inter-mode interference. Boresight direction misalignment also can result in a channel matrix that is not a circulant matrix, and thus discrete Fourier transform (DFT) vectors cannot be the eigenvectors of the channel matrix, resulting in OAM beams that are not orthogonal. Spatial multiplexing OAM beams that are not orthogonal can be impossible in some cases, and in cases in which spatial multiplexing is possible, can sometimes be achieved only through complex and/or costly (e.g., in terms of signaling overhead and/or power consumption) interference techniques. Accordingly, boresight direction misalignment can have a negative impact on efficient spatial multiplexing, and, thus, a negative impact on network performance.

Some aspects of the techniques and apparatuses described herein may provide for efficiently estimating a boresight direction alignment between a first OAM node and a second OAM node so that the first OAM node and/or the second OAM node may adjust an orientation of an antenna panel mechanically to achieve and/or maintain boresight direction alignment. In some aspects, the first OAM node may transmit a boresight direction alignment reference signal to the second OAM node. The second OAM node may determine boresight direction alignment information based at least in part on the reference signal and may adjust an antenna panel orientation based at least in part on the boresight direction alignment information. The second OAM node may transmit a boresight direction alignment status report to the first OAM node to inform the first OAM node of a status of the boresight direction alignment between the two nodes and/or to request a modified boresight direction alignment reference signal. In some aspects, the second OAM node may transmit an additional reference signal to the first OAM node. The first OAM node may determine additional boresight direction alignment information and may adjust an antenna panel orientation based at least in part on the additional boresight direction alignment information.

In some aspects, the boresight direction alignment techniques described herein may be used during an initial connection operation and/or during a connected state to facilitate maintaining boresight direction alignment during communications. In some aspects, the boresight direction alignment reference signal may be configured such that the transmitting device does not need to beamform the reference signal, thereby reducing complexity and/or cost (e.g., in terms of signaling overhead and/or power consumption). In some aspects, the boresight direction alignment estimate may be based on one-shot signal reception, which may reduce latency.

According to aspects, the boresight direction alignment estimation and correction techniques described herein may facilitate achieving and/or maintaining boresight direction alignment, thereby reducing inter-mode interference and, thus, facilitate maintaining OAM communication links and/or improving data throughput. In some aspects, achieving and/or maintaining boresight direction alignment may result in a circulant channel matrix in which DFT vectors may be the eigenvectors of the channel matrix, resulting in OAM beams that are orthogonal, thereby facilitating spatial multiplexing. As a result, aspects may facilitate increases in throughput, signal reliability, link maintenance and/or signal quality, without unnecessary increases in system complexity or cost.

Figure 6:
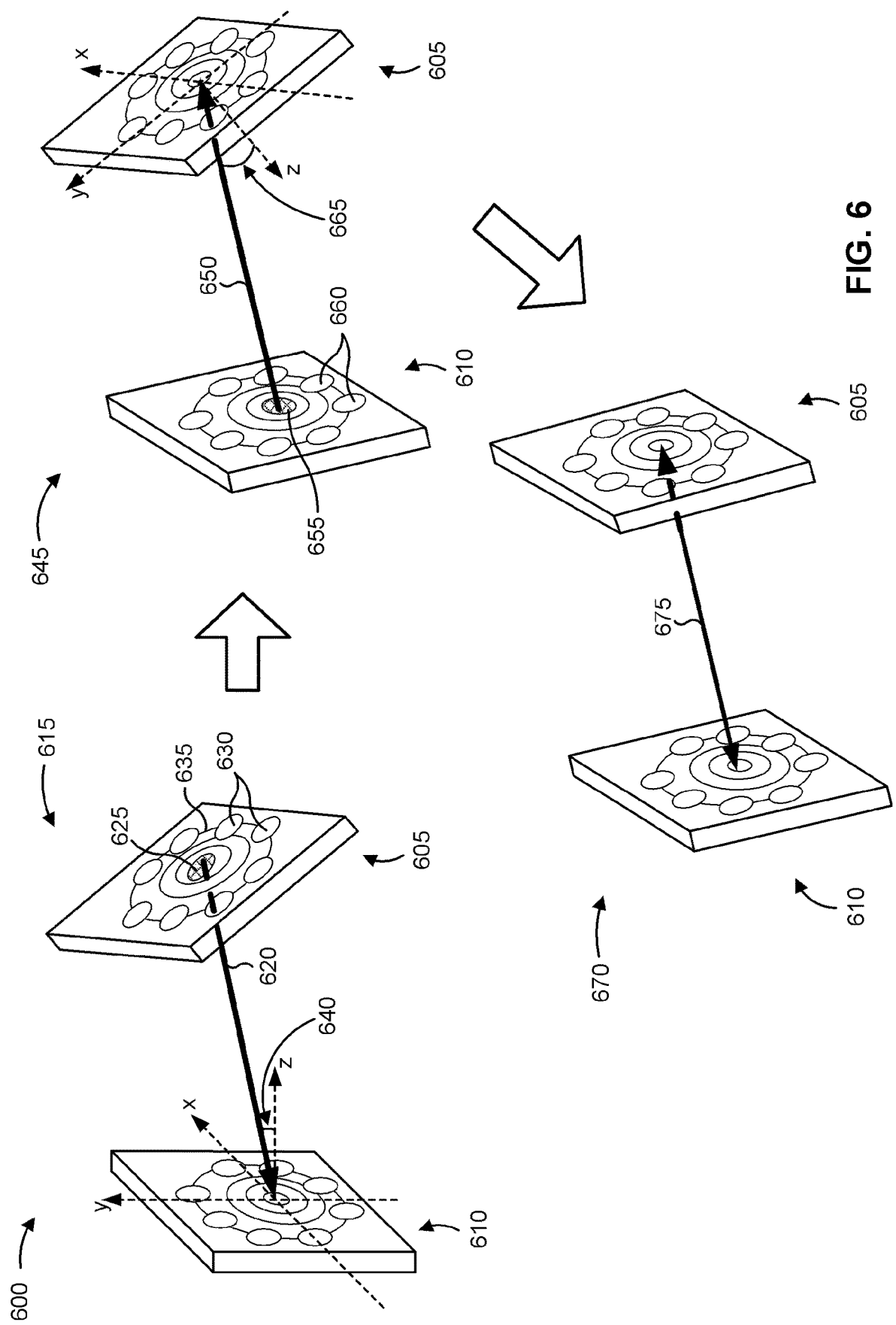
FIGS. 6 and 7 are diagrams illustrating examples associated with boresight direction alignment of OAM nodes based on reference signal transmission and reception, in accordance with the present disclosure.

FIG. 6 is a diagram illustrating an example 600 associated with boresight direction alignment of OAM nodes based on reference signal transmission and reception, in accordance with the present disclosure. As shown in FIG. 6, a first OAM node 605 and a second OAM node 610 may communicate with one another using OAM multiplexing based communication. The first OAM node 605 and the second OAM node 610 are shown as antenna panels for the purpose of illustrating the boresight direction alignment concepts described herein. In some aspects, the first OAM 605 and/or the second OAM node 610 may include any number of other components and/or antenna panels, as described above. For example, in some aspects, the first OAM node 605 may include an OAM transmitter (e.g., the OAM transmitter 305 depicted in FIG. 3, the OAM transmitter 405 depicted in FIG. 4, or the OAM transmitter 505 depicted in FIG. 5) or an OAM receiver (e.g., the OAM receiver 310 depicted in FIG. 3, the OAM receiver 410 depicted in FIG. 4, or the OAM receiver 510 depicted in FIG. 5). In some aspects, the second OAM node 610 may include an OAM transmitter (e.g., the OAM transmitter 305 depicted in FIG. 3, the OAM transmitter 405 depicted in FIG. 4, or the OAM transmitter 505 depicted in FIG. 5) or an OAM receiver (e.g., the OAM receiver 310 depicted in FIG. 3, the OAM receiver 410 depicted in FIG. 4, or the OAM receiver 510 depicted in FIG. 5).

In a first relative orientation 615 between the first OAM node 605 and the second OAM node 610, the first OAM node 605 and the second OAM node 610 are in boresight direction misalignment with one another. In some aspects, the first OAM node 605 may transmit, and the second OAM node 610 may receive, a boresight direction alignment reference signal 620. As shown, the first OAM node 605 may transmit the reference signal 620 using a circle center antenna element 625. The reference signal 620 may be referred to as a circle center reference signal (CCRS). In some other aspects, the first OAM node 605 may transmit the reference signal 620 using one or more other antenna elements 630 in addition to, or in lieu of, the circle center antenna element 625. As shown, the antenna elements 630 may be distributed around a circle 635 that is concentric with the circle center antenna element 625 (e.g., as described above in connection with a UCA).

In some aspects, for example, a boresight direction alignment reference signal may be configured according to one of three modes: from an OAM transmitter to an OAM receiver, from an OAM receiver to an OAM transmitter, or bi-directional. In some aspects, the boresight direction alignment reference signal may include an aperiodic reference signal that is transmitted in response to receiving a trigger indication. In some aspects, the boresight direction alignment reference signal may be a periodic or semi-persistent reference signal. A periodic or semi-persistent reference signal may be configured and/or reconfigured by one of the OAM nodes and may be activated and/or deactivated (e.g., via an activation and/or deactivation signal).

In some aspects, the boresight direction alignment reference signal may include a channel state information reference signal (CSI-RS) or a sounding reference signal (SRS). The boresight direction alignment reference signal may be beamformed using a specified OAM mode (e.g., a DFT or inverse DFT (IDFT) beam weight). In some aspects, a wireless communication standard may specify a number of antenna elements that are to be used to transmit the boresight direction alignment reference signal. In some aspects, the first OAM node 605 may determine the antenna elements to use and may transmit an indication to the second OAM node 610 that indicates the number of antenna elements to be used, identifiers associated with the antenna elements to be used, whether a circle of antenna elements are to be used, a radius of a ring of antenna elements to be used, and/or a number of antenna elements in the ring of antenna elements, among other examples.

In some aspects, because the beam coverages of OAM mode 0 and OAM mode n>0 correspond to a circle or a ring (e.g., different OAM modes result in different ring areas) respectively, the first OAM node 605 and/or the second OAM node 610 may select an OAM mode so that a receiving antenna element circle lies in the beam coverage area. To facilitate ensuring that the receiving antenna element circle lies in the beam coverage area, multiple OAM modes may be used to expand the total beam coverage area. In some aspects in which the boresight direction alignment reference signal comprises a CSI-RS or an SRS, a wireless communication standard may specify, or a central network node may configure, that the CSI-RS or SRS is to be used for boresight direction alignment. In some aspects, for example, the first OAM node 605 may receive a configuration that indicates specified radio resources to be used for the boresight direction alignment reference signal. The radio resources may be indicated using a CSI-RS resource indicator (CRI) or an SRS index. In some aspects, the CSI-RS or the SRS may be a sidelink (SL) CSI-RS or an SL SRS, respectively.

In some aspects, the second OAM node 610 may transmit a boresight misalignment estimation capability indication to the first OAM node 605. For example, in some aspects, the boresight misalignment estimation capability indication may indicate a low capability or a high capability. The first OAM node 605 may transmit a specified type of boresight direction alignment reference signal based at least in part on the capability. For example, the first OAM node 605 may transmit a CCRS if the boresight misalignment estimation capability indication indicates a low capability and a CSI-RS (or SRS) if the boresight misalignment estimation capability indication indicates a high capability. In some aspects, a total transmission power for the boresight direction alignment reference signal may be fixed regardless of the number of antenna elements used. For example, in some aspects, using more than one antenna element may enable the first OAM node 605 to use a higher transmission power than the first OAM 605 would use to transmit a CCRS.

The second OAM node 610 may determine boresight direction alignment information based at least in part on the reference signal 620. As shown, the first OAM node 605 has a corresponding boresight direction along the z-axis of the Cartesian coordinate system shown in FIG. 6 (shown as an x-axis (labeled "x"), a perpendicular y-axis (labeled "y"), and a perpendicular z-axis (labeled "z")) and the second OAM node 610 has a corresponding boresight direction corresponding to a direction of the reference signal 620. In some aspects, the second OAM node 610 may perform boresight direction misalignment estimation by determining a direction of arrival (DoA) estimate corresponding to the reference signal 620. "DoA" may refer to an angle of arrival (AoA) 640, which may, for example, be an intersection angle of the boresight direction of the first OAM node and the boresight direction of the second OAM node 610. As shown in the first relative orientation 615, the DoA may have a value that is not at least approximately zero. Thus, the second OAM node 610 may determine that the first OAM node 605 and the second OAM node 610 are in boresight direction misalignment with one another.

Any number of algorithms for determining the DoA may be used, in accordance with the present disclosure. In some aspects, accuracy of the estimation may be improved by transmitting the reference signal using more than one antenna element, and the degree of accuracy may correlate to the number of antenna elements used. In some aspects, the degree of accuracy of the DoA estimate may correlate to whether the reference signal is transferred via a line-of-sight (LOS) communication or a no-line-of-sight (NLOS) communication. For example, reference signals transmitted using LOS communications may result in more accurate DoA estimates than reference signals transmitted using NLOS communications.

In some aspects, the second OAM node 610 may transmit, and the first OAM node 605 may receive, a boresight direction alignment status report that may indicate whether further boresight direction alignment operations should be performed and/or whether a modified boresight direction alignment reference signal is requested. In some aspects, the boresight direction alignment status report may indicate an inter-mode interference strength, a DoA estimate, and/or a DoA estimate status (e.g., a confidence level associated with the DoA estimate, an accuracy measurement associated with the DoA estimate, an indication that an antenna panel orientation was adjusted, and/or an estimated change in the DoA estimate based on an adjustment of the antenna panel), among other examples.

The first OAM node 605 may transmit a modified boresight direction alignment reference signal based at least in part on the request. In some aspects, the request may indicate one or more modifications to the reference signal format to be made. The modifications may include, for example, an increase in transmission power, a decrease in transmission power, an increase in transmission frequency (a number of times that the reference signal is transmitted within a specified time period), and/or a decrease in transmission frequency, among other examples.

In some aspects, the second OAM node 610 may adjust an orientation of an antenna panel based at least in part on the boresight direction alignment information (e.g., to reduce the value of the DoA estimate). For example, the second OAM node 610 may adjust the orientation of the antenna panel so that it more directly faces the circle center antenna element 625 of the first OAM node 605, as shown in the second relative orientation 645 depicted in FIG. 6. In some aspects, as shown, the second OAM node 610 may transmit, and the first OAM node 605 may receive, an additional boresight direction alignment reference signal 650. As shown, the second OAM node 610 may transmit the additional boresight direction alignment reference signal 650 using a circle center antenna element 655. In some other aspects, the second OAM node 610 may transmit the additional boresight direction alignment reference signal 650 using one or more other antenna elements 660 in addition to, or in lieu of, the circle center antenna element 655. The first OAM node 605 may determine additional boresight direction alignment information based at least in part on the additional boresight direction alignment reference signal 650. For example, the first OAM node 605 may perform boresight direction misalignment estimation by determining an additional DoA estimate (e.g., AoA 665) corresponding to the additional boresight direction alignment reference signal 650.

The first OAM node 605 may adjust an orientation of an antenna panel to reduce the value of the DoA estimate, as shown by a third relative orientation 670. In the third relative orientation 670, the first OAM node 605 and the second OAM node 610 may be in boresight direction alignment, as indicated by reference number 675.

As indicated above, FIG. 6 is provided as an example. Other examples may differ from what is described with regard to FIG. 6.

Figure 7:
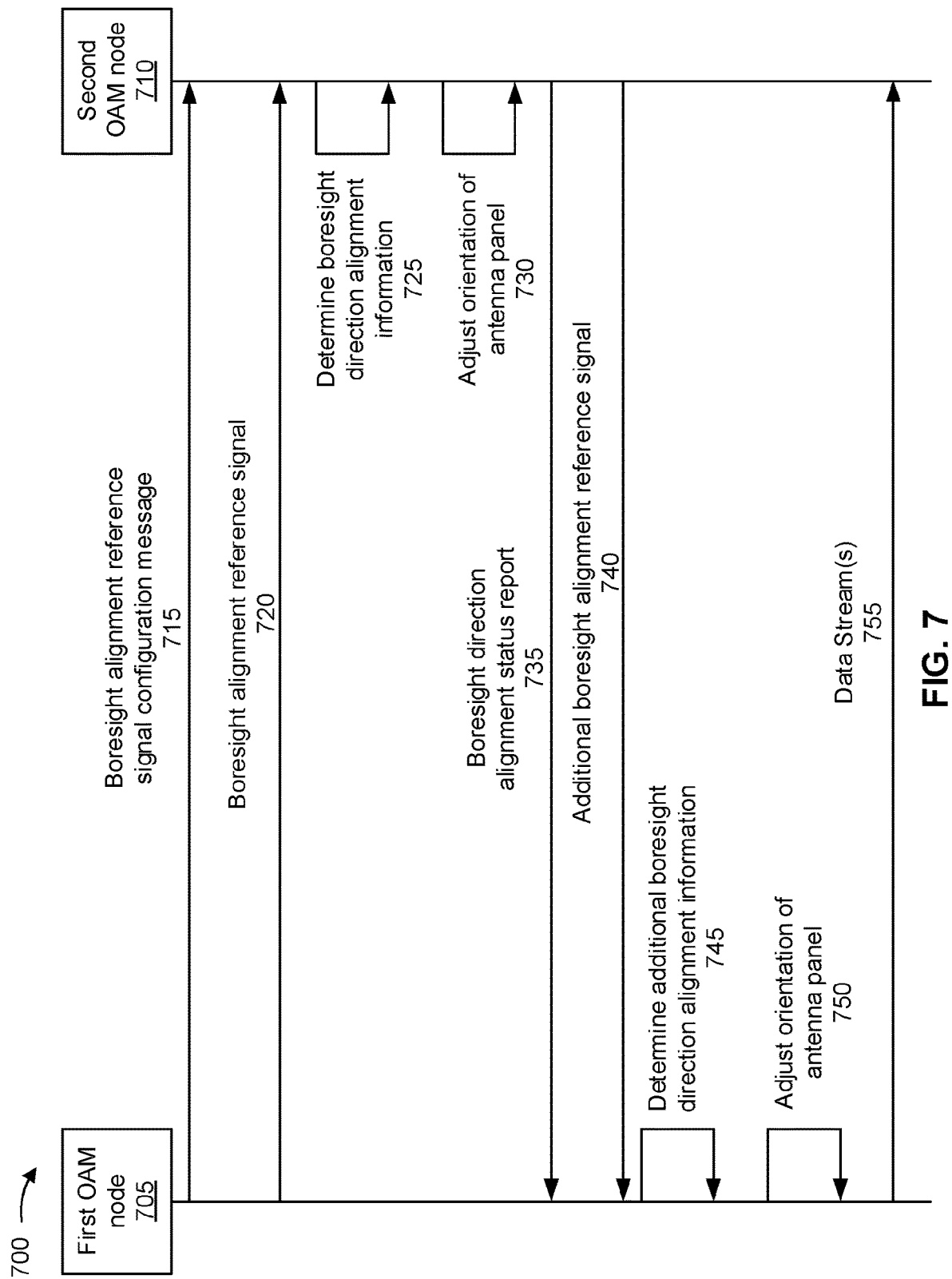

FIG. 7 is a diagram illustrating an example 700 associated with boresight direction alignment of OAM nodes based on reference signal transmission and reception, in accordance with the present disclosure. As shown in FIG. 7, a first OAM node 705 and a second OAM node 710 may communicate with one another using OAM multiplexing based communication. In some aspects, the first OAM node 705 may be, or be similar to, the first OAM node 605 depicted in FIG. 6, and the second OAM node 710 may be, or be similar to, the second OAM node 610 depicted in FIG. 6. In some aspects, the first OAM node 705 and the second OAM node 710 may communicate as part of an initial connection operation. In some aspects, the first OAM node 705 and the second OAM node 710 may be in a connected state with respect to one another.

As shown by reference number 715, the first OAM node 705 may transmit, and the second OAM node 710 may receive, a boresight direction alignment reference signal configuration message. The boresight direction alignment reference signal configuration message may include a boresight direction alignment reference signal configuration, which may be represented as configuration information. In some aspects, the boresight direction alignment reference signal configuration message is not OAM multiplexed with any other signals. In this way, communication of the boresight direction alignment reference signal configuration message may be achieved after synchronization but does not require boresight direction alignment for effective transmission and reception. In some aspects, the first OAM node 705 may transmit the boresight direction alignment reference signal configuration message based at least in part on transmitting a configuration communication that includes the boresight direction alignment reference signal configuration message. In some aspects, the configuration communication may include at least one of a radio resource control (RRC) message, a medium access control control element (MAC CE), or a layer 1 signal.

In some aspects, the configuration message may include configuration information associated with a boresight direction alignment reference signal and/or a boresight direction alignment status report, among other examples. In some aspects, the boresight direction alignment reference signal configuration message may configure a CCRS, a CSI-RS, and/or an SRS, among other examples. For example, the configuration message may include a CRI and/or an SRS index.

In some aspects, the configuration information may indicate a boresight direction alignment reference signal format. The boresight direction alignment reference signal format may indicate at least one of a time resource, a frequency resource, a repetition periodicity, or a boresight direction alignment reference signal sequence. In some aspects, the configuration information may include a ring configuration that may indicate at least one of a radius of a ring of antenna elements that are used to transmit a boresight direction alignment reference signal, or a number of antenna elements in the ring of antenna elements. In some aspects, the ring configuration may be transmitted in a communication that is separate from the boresight direction alignment reference signal configuration message.

In some aspects, the reference signal format may indicate a single-carrier waveform, and one reference signal transmission may be configured to cover one or multiple time-domain units. The reference signal format may include a start position (e.g., an offset that indicates a time at which to begin the transmission), a length of a time-domain unit, and/or a length of a time domain resource (e.g., a period). In some aspects, a multi-carrier waveform may be used, and one reference signal transmission may be configured to cover one or multiple time-frequency two-dimensional units. The reference signal format may include a start position, a length of the time resource, a length of the frequency resource, interval information associated with the time resource, and/or interval information associated with the frequency resource.

In some aspects, the first OAM node 705 may include an OAM transmitter, and the boresight direction alignment reference signal configuration message may indicate configuration information associated with at least one of a boresight direction alignment reference signal or an additional boresight direction alignment reference signal to be transmitted by the second OAM node 710 to the first OAM node 705.

As shown by reference number 720, the first OAM node 705 may transmit, and the second OAM node 710 may receive, a boresight direction alignment reference signal. In some aspects, the first OAM node 705 may transmit the boresight direction alignment reference signal during an initial connection operation. In some other aspects, the first OAM node 705 may transmit the boresight direction alignment reference signal while the first OAM node 705 and the second OAM node 710 are in a connected state with respect to one another. In some aspects, the first OAM node 705 may transmit the boresight direction alignment reference signal based at least in part on the boresight direction alignment reference signal format indicated in the boresight direction alignment reference signal configuration. In some aspects, one or more components of the boresight direction alignment reference signal format may be specified by a wireless communication standard.

In some aspects, the first OAM node 705 may transmit the boresight direction alignment reference signal using a single-carrier waveform. In some other aspects, the first OAM node 705 may transmit the boresight direction alignment reference signal using a multi-carrier waveform. In some aspects, the boresight direction alignment reference signal may include a CSI-RS or an SRS. In some aspects, the boresight direction alignment reference signal may include a sidelink CSI-RS or a sidelink SRS. In some aspects, the first OAM node 705 may beamform the boresight direction alignment reference signal according to one or more OAM modes. In some aspects, the boresight direction alignment reference signal may not be OAM multiplexed with any other signals. In some aspects, the first OAM node 705 may time division multiplex the boresight direction alignment reference signal with a synchronization signal block (SSB).

In some aspects, the boresight direction alignment reference signal may include a CCRS transmitted using a circle center antenna element of a uniform circular array antenna panel of the first OAM node 705. In some aspects, the first OAM node 705 may transmit the boresight direction alignment reference signal using one or more antenna elements of a UCA antenna panel. For example, in some aspects, the first OAM node 705 may transmit the boresight direction alignment reference signal using all of the antenna elements of the UCA antenna panel. In some aspects, the second OAM node 710 may transmit, and the first OAM node 705 may receive, a boresight misalignment estimation capability indication. The first OAM node 705 may transmit the boresight direction alignment reference signal using the one or more antenna elements based at least in part on the boresight misalignment estimation capability indication.

In some aspects, the first OAM node 705 may transmit at least one repetition of a periodic reference signal. In some aspects, the first OAM node 705 may transmit an activation message to activate the periodic reference signal or deactivate the periodic reference signal. In some aspects, the boresight direction alignment reference signal may be an aperiodic reference signal. For example, in some aspects, the second OAM node 710 may transmit, and the first OAM node 705 may receive, a trigger indication. The first OAM node 705 may transmit the boresight direction alignment reference signal based at least in part on receiving the trigger indication. In some aspects, receiving the trigger indication may include receiving at least one of a signal having a trigger sequence or a signal having a trigger message.

In some aspects, the first OAM node 705 may determine a potential collision between the boresight direction alignment reference signal and an additional signal with respect to at least one of a time resource or a frequency resource. The first OAM node 705 may mute the additional signal based at least in part on determining the potential collision. In some aspects, the additional signal may have a priority level that is higher than a priority level of the boresight direction alignment reference signal, and the first OAM node 705 may mute the boresight direction alignment reference signal based at least in part on determining the potential collision.

As shown by reference number 725, the second OAM node 710 may determine boresight direction alignment information. The second OAM node 710 may determine the boresight direction alignment information based at least in part on determining a DoA estimate. As shown by reference number 730, the second OAM node 710 may adjust an orientation of an antenna panel based at least in part on the determined boresight direction alignment information.

As shown by reference number 735, the second OAM node 710 may transmit, and the first OAM node 705 may receive, a boresight direction alignment status report. In some aspects, the boresight direction alignment status report may indicate boresight direction alignment information based at least in part on the boresight direction alignment reference signal. In some aspects, the boresight direction alignment status report is not OAM multiplexed with any other signals. In some aspects, the second OAM node 710 may transmit the boresight direction alignment status report based at least in part on transmitting a report communication that includes the boresight direction alignment status report. The report communication may include at least one of an RRC message, a MAC CE, or a layer 1 signal.

In some aspects, the boresight direction alignment information may indicate at least one of an inter-mode interference strength associated with the boresight direction alignment reference signal, a DoA estimate, a DoA estimate status, a direction alignment status, or a boresight direction alignment reference signal modification request. In some aspects, the boresight direction alignment status may indicate that further direction alignment is to be performed or that direction alignment is completed.

In some aspects, the first OAM node 705 may transmit a modified boresight direction alignment reference signal. The modified boresight direction alignment reference signal may include a modified format based at least in part on the boresight direction alignment reference signal modification request. For example, the boresight direction alignment reference signal modification request may indicate at least one of a modification of a boresight direction alignment reference signal transmission power, or a modification of a boresight direction alignment reference signal repetition periodicity.

As shown by reference number 740, the second OAM node 710 may transmit, and the first OAM node 705 may receive, an additional boresight direction alignment reference signal. As shown by reference number 745, the first OAM node 705 may determine additional boresight direction alignment information based at least in part on the additional boresight direction alignment reference signal. As shown by reference number 750, the first OAM node 705 may adjust an orientation of an antenna panel of the first OAM node 705. The first OAM node 705 may adjust an orientation of an antenna panel of the first OAM node 705 based at least in part on the additional boresight direction alignment reference signal. In some aspects, the first OAM node 705 may transmit a boresight direction alignment status report to the second OAM node 710. Any number of additional reference signals may be transmitted between the first OAM node 705 and the second OAM node 710 until the resulting antenna panel orientation adjustments result in boresight direction alignment between the first OAM node 705 and the second OAM node 710.

As shown by reference number 755, the first OAM node 705 may transmit, and the second OAM node 710 may receive, at least one data stream using the boresight aligned antenna panels.

As indicated above, FIG. 7 is provided as an example. Other examples may differ from what is described with respect to FIG. 7.

Figure 8:
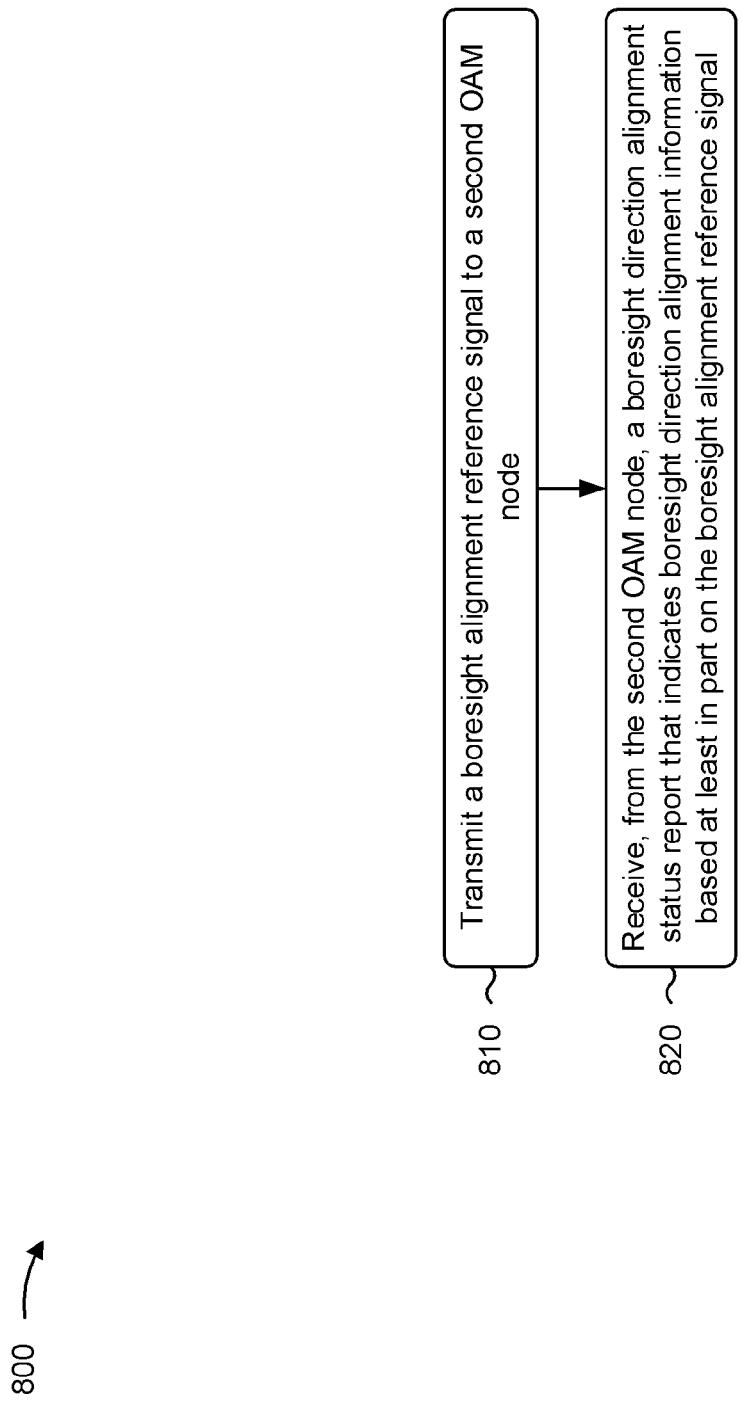
FIGS. 8 and 9 are diagrams illustrating example processes associated with boresight direction alignment of OAM nodes based on reference signal transmission and reception, in accordance with the present disclosure.

FIG. 8 is a diagram illustrating an example process 800 performed, for example, by a first OAM node, in accordance with the present disclosure. Example process 800 is an example where the first OAM node (e.g., first OAM node 705) performs operations associated with boresight direction alignment based on reference signal transmission and reception.

As shown in FIG. 8, in some aspects, process 800 may include transmitting a boresight direction alignment reference signal to a second OAM node (block 810). For example, the first OAM node (e.g., using communication manager 1008 and/or transmission component 1004, depicted in FIG. 10) may transmit a boresight direction alignment reference signal to a second OAM node, as described above.

As further shown in FIG. 8, in some aspects, process 800 may include receiving, from the second OAM node, a boresight direction alignment status report that indicates boresight direction alignment information based at least in part on the boresight direction alignment reference signal (block 820). For example, the first OAM node (e.g., using communication manager 1008 and/or reception component 1002, depicted in FIG. 10) may receive, from the second OAM node, a boresight direction alignment status report that indicates boresight direction alignment information based at least in part on the boresight direction alignment reference signal, as described above.

Process 800 may include additional aspects, such as any single aspect or any combination of aspects described below and/or in connection with one or more other processes described elsewhere herein.

In a first aspect, the boresight direction alignment reference signal comprises a CCRS, and transmitting the boresight direction alignment reference signal comprises transmitting the boresight direction alignment reference signal using a circle center antenna element of a uniform circular array antenna panel. In a second aspect, alone or in combination with the first aspect, transmitting the boresight direction alignment reference signal comprises transmitting the boresight direction alignment reference signal using one or more antenna elements of a UCA antenna panel. In a third aspect, alone or in combination with the second aspect, transmitting the boresight direction alignment reference signal comprises transmitting the boresight direction alignment reference signal using all of the antenna elements of the UCA antenna panel.

In a fourth aspect, alone or in combination with one or more of the second through third aspects, process 800 includes receiving, from the second OAM node, a boresight misalignment estimation capability indication, wherein transmitting the boresight direction alignment reference signal comprises transmitting the boresight direction alignment reference signal using the one or more antenna elements based at least in part on the boresight misalignment estimation capability indication.

In a fifth aspect, alone or in combination with one or more of the first through fourth aspects, the boresight direction alignment reference signal comprises a CSI-RS or an SRS. In a sixth aspect, alone or in combination with the fifth aspect, the boresight direction alignment reference signal comprises a sidelink CSI-RS or a sidelink SRS. In a seventh aspect, alone or in combination with one or more of the first through sixth aspects, transmitting the boresight direction alignment reference signal comprises beamforming the boresight direction alignment reference signal according to one or more OAM modes. In an eighth aspect, alone or in combination with the seventh aspect, the one or more OAM modes comprise a plurality of OAM modes.

In a ninth aspect, alone or in combination with one or more of the first through eighth aspects, process 800 includes transmitting, to the second OAM node, a ring configuration indication that indicates at least one of a radius of a ring of antenna elements that are used to transmit the boresight direction alignment reference signal, or a number of antenna elements in the ring of antenna elements.

In a tenth aspect, alone or in combination with one or more of the first through ninth aspects, process 800 includes receiving a configuration that indicates a set of radio resources corresponding to the boresight direction alignment reference signal. In an eleventh aspect, alone or in combination with the tenth aspect, the configuration comprises a channel state information reference signal resource indicator or a sounding reference signal index.

In a twelfth aspect, alone or in combination with one or more of the first through eleventh aspects, the boresight direction alignment status report is not OAM multiplexed with any other signals. In a thirteenth aspect, alone or in combination with one or more of the first through twelfth aspects, transmitting the boresight direction alignment reference signal comprises time division multiplexing the boresight direction alignment reference signal with an SSB.

In a fourteenth aspect, alone or in combination with one or more of the first through thirteenth aspects, the first OAM node is in a connected state with respect to the second OAM node, and the first OAM node comprises an OAM transmitter and the second OAM node comprises an OAM receiver. In a fifteenth aspect, alone or in combination with one or more of the first through fourteenth aspects, the first OAM node is in a connected state with respect to the second OAM node, and the first OAM node comprises an OAM receiver and the second OAM node comprises an OAM transmitter.

In a sixteenth aspect, alone or in combination with one or more of the first through fifteenth aspects, transmitting the boresight direction alignment reference signal comprises transmitting at least one repetition of a periodic reference signal. In a seventeenth aspect, alone or in combination with the sixteenth aspect, process 800 includes transmitting an activation message to activate the periodic reference signal or deactivate the periodic reference signal.

In an eighteenth aspect, alone or in combination with one or more of the first through seventeenth aspects, process 800 includes receiving, from the second OAM node, a trigger indication, wherein transmitting the boresight direction alignment reference signal comprises transmitting the boresight direction alignment reference signal based at least in part on receiving the trigger indication. In a nineteenth aspect, alone or in combination with the eighteenth aspect, receiving the trigger indication comprises receiving at least one of a signal having a trigger sequence or a signal having a trigger message.

In a twentieth aspect, alone or in combination with one or more of the first through nineteenth aspects, the boresight direction alignment reference signal is not OAM multiplexed with any other signals.

In a twenty-first aspect, alone or in combination with one or more of the first through twentieth aspects, process 800 includes determining a potential collision between the boresight direction alignment reference signal and an additional signal with respect to at least one of a time resource or a frequency resource, and muting the additional signal based at least in part on determining the potential collision. In a twenty-second aspect, alone or in combination with one or more of the first through twenty-first aspects, process 800 includes determining a potential collision between the boresight direction alignment reference signal and an additional signal with respect to at least one of a time resource or a frequency resource, wherein the additional signal has a priority level that is higher than a priority level of the boresight direction alignment reference signal, and muting the boresight direction alignment reference signal based at least in part on determining the potential collision.

In a twenty-third aspect, alone or in combination with one or more of the first through twenty-second aspects, transmitting the boresight direction alignment reference signal comprises transmitting the boresight direction alignment reference signal during an initial connection operation.

In a twenty-fourth aspect, alone or in combination with one or more of the first through twenty-third aspects, the first OAM node comprises an OAM transmitter, and process 800 further includes transmitting, to the second OAM node, a boresight direction alignment reference signal configuration message that indicates configuration information associated with at least one of the boresight direction alignment reference signal or an additional boresight direction alignment reference signal. In a twenty-fifth aspect, alone or in combination with the twenty-fourth aspect, the boresight direction alignment reference signal configuration message is not OAM multiplexed with any other signals.

In a twenty-sixth aspect, alone or in combination with one or more of the first through twenty-fifth aspects, the configuration information indicates a boresight direction alignment reference signal format, and transmitting the boresight direction alignment reference signal comprises transmitting the boresight direction alignment reference signal based at least in part on the boresight direction alignment reference signal format. In a twenty-seventh aspect, alone or in combination with the twenty-sixth aspect, the boresight direction alignment reference signal format indicates at least one of a time resource, a frequency resource, a repetition periodicity, or a boresight direction alignment reference signal sequence.

In a twenty-eighth aspect, alone or in combination with the twenty-seventh aspect, transmitting the boresight direction alignment reference signal comprises transmitting the boresight direction alignment reference signal using a single-carrier waveform, and the time resource comprises one or more time domain units. In a twenty-ninth aspect, alone or in combination with the twenty-seventh aspect, transmitting the boresight direction alignment reference signal comprises transmitting the boresight direction alignment reference signal using a multi-carrier waveform, wherein the time resource comprises one or more time domain units, and the frequency resource comprises one or more frequency domain units. In a thirtieth aspect, alone or in combination with the twenty-seventh aspect, the boresight direction alignment reference signal format indicates a start position, a length of the time resource, a length of the frequency resource, interval information associated with the time resource, and interval information associated with the frequency resource.

In a thirty-first aspect, alone or in combination with one or more of the first through thirtieth aspects, transmitting the boresight direction alignment reference signal configuration message comprises transmitting a configuration communication that includes the boresight direction alignment reference signal configuration message, the configuration communication comprising at least one of an RRC message, a MAC CE, or a layer 1 signal. In a thirty-second aspect, alone or in combination with one or more of the first through thirty-first aspects, receiving the boresight direction alignment status report comprises receiving a report communication that includes the boresight direction alignment status report, the report communication comprising at least one of an RRC message, a MAC CE, or a layer 1 signal.

In a thirty-third aspect, alone or in combination with one or more of the first through thirty-second aspects, the boresight direction alignment information indicates at least one of an inter-mode interference strength associated with the boresight direction alignment reference signal, a direction of arrival estimate, a direction of arrival estimate status, a direction alignment status, or a boresight direction alignment reference signal modification request. In a thirty-fourth aspect, alone or in combination with the thirty-third aspect, the boresight direction alignment status report indicates that further direction alignment is to be performed or that direction alignment is completed.

In a thirty-fifth aspect, alone or in combination with one or more of the thirty-third through thirty-fourth aspects, process 800 includes transmitting a modified boresight direction alignment reference signal, wherein the modified boresight direction alignment reference signal comprises a modified format based at least in part on the boresight direction alignment reference signal modification request. In a thirty-sixth aspect, alone or in combination with one or more of the thirty-third through thirty-fifth aspects, the boresight direction alignment reference signal modification request indicates at least one of a modification of a boresight direction alignment reference signal transmission power, or a modification of a boresight direction alignment reference signal repetition periodicity.

In a thirty-seventh aspect, alone or in combination with one or more of the first through thirty-sixth aspects, process 800 includes receiving, from the second OAM node, an additional boresight direction alignment reference signal. In a thirty-eighth aspect, alone or in combination with the thirty-seventh aspect, process 800 includes adjusting an orientation of an antenna panel of the first OAM node based at least in part on the additional boresight direction alignment reference signal. In a thirty-ninth aspect, alone or in combination with the thirty-eighth aspect, process 800 includes determining additional boresight direction alignment information based at least in part on the additional boresight direction alignment reference signal, wherein adjusting the orientation of the antenna panel of the first OAM node comprises adjusting the orientation of the antenna panel of the first OAM node based at least in part on the additional boresight direction alignment information. In a fortieth aspect, alone or in combination with the thirty-seventh aspect, the first OAM node comprises an OAM transmitter, and process 800 further includes transmitting, to the second OAM node, a boresight direction alignment reference signal configuration message that indicates configuration information associated with at least one of the boresight direction alignment reference signal or the additional boresight direction alignment reference signal.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
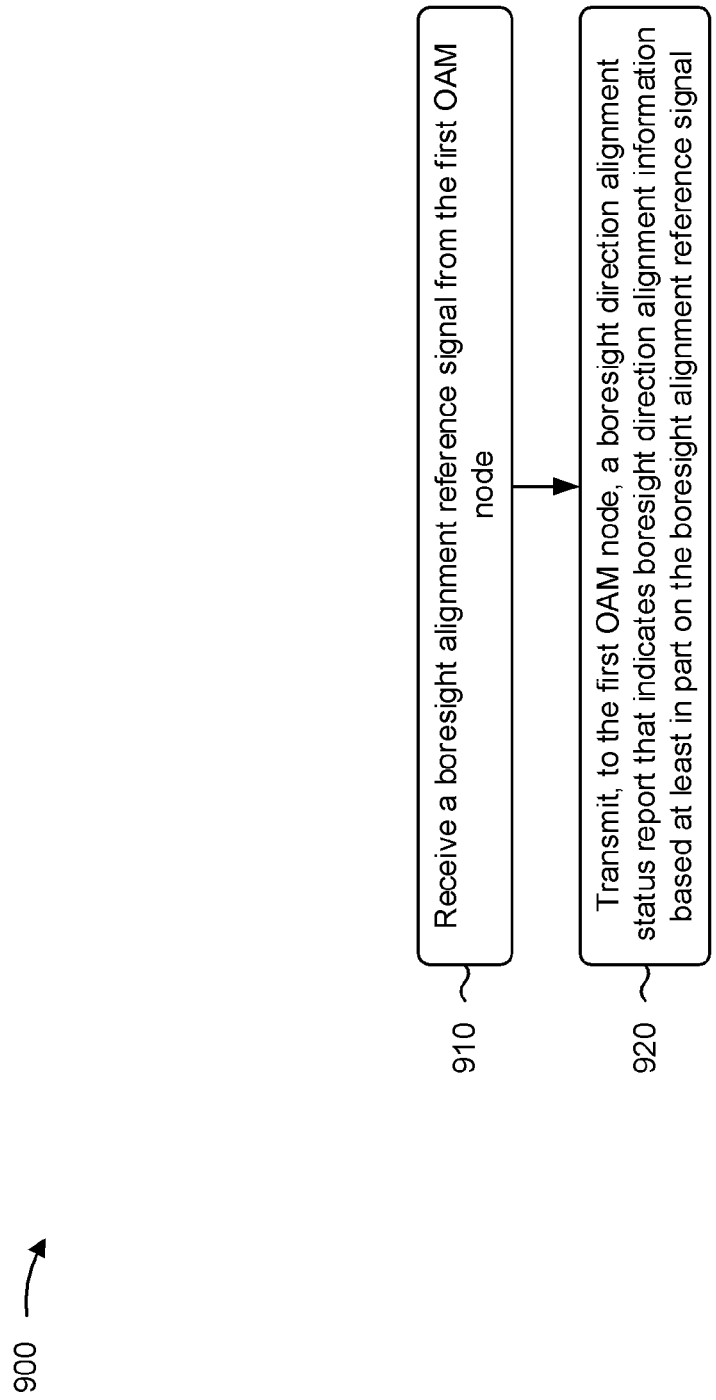

FIG. 9 is a diagram illustrating an example process 900 performed, for example, by a second OAM node, in accordance with the present disclosure. Example process 900 is an example where the second OAM node (e.g., second OAM node 710) performs operations associated with boresight direction alignment based on reference signal transmission and reception.

As shown in FIG. 9, in some aspects, process 900 may include receiving a boresight direction alignment reference signal from the first OAM node (block 910). For example, the second OAM node (e.g., using communication manager 1008 and/or reception component 1002, depicted in FIG. 2) may receive a boresight direction alignment reference signal from the first OAM node, as described above.

As further shown in FIG. 9, in some aspects, process 900 may include transmitting, to the first OAM node, a boresight direction alignment status report that indicates boresight direction alignment information based at least in part on the boresight direction alignment reference signal (block 920). For example, the second OAM node (e.g., using communication manager 1008 and/or transmission component 1004, depicted in FIG. 10) may transmit, to the first OAM node, a boresight direction alignment status report that indicates boresight direction alignment information based at least in part on the boresight direction alignment reference signal, as described above.

Process 900 may include additional aspects, such as any single aspect or any combination of aspects described below and/or in connection with one or more other processes described elsewhere herein.

In a first aspect, the boresight direction alignment reference signal comprises a CCRS. In a second aspect, alone or in combination with the first aspect, receiving the boresight direction alignment reference signal comprises receiving the boresight direction alignment reference signal using one or more antenna elements of a uniform circular array antenna panel. In a third aspect, alone or in combination with one or more of the first and second aspects, receiving the boresight direction alignment reference signal comprises receiving the boresight direction alignment reference signal using all of the antenna elements of the uniform circular array antenna panel. In a fourth aspect, alone or in combination with the third aspect, process 900 includes transmitting, to the first OAM node, a boresight misalignment estimation capability indication, wherein receiving the boresight direction alignment reference signal comprises receiving the boresight direction alignment reference signal using the one or more antenna elements based at least in part on the boresight misalignment estimation capability indication.

In a fifth aspect, alone or in combination with one or more of the first through fourth aspects, the boresight direction alignment reference signal comprises a CSI-RS or an SRS. In a sixth aspect, alone or in combination with the fifth aspect, the boresight direction alignment reference signal comprises a sidelink CSI-RS or a sidelink SRS. In a seventh aspect, alone or in combination with one or more of the first through sixth aspects, receiving the boresight direction alignment reference signal comprises receiving a beamformed boresight direction alignment reference signal according to one or more OAM modes.

In an eighth aspect, alone or in combination with the seventh aspect, the one or more OAM modes comprise a plurality of OAM modes. In a ninth aspect, alone or in combination with one or more of the first through eighth aspects, process 900 includes receiving, from the first OAM node, a ring configuration indication that indicates at least one of a radius of a ring of antenna elements that are used to transmit the boresight direction alignment reference signal, or a number of antenna elements in the ring of antenna elements.

In a tenth aspect, alone or in combination with one or more of the first through ninth aspects, the boresight direction alignment status report is not OAM multiplexed with any other signals. In an eleventh aspect, alone or in combination with one or more of the first through tenth aspects, the boresight direction alignment reference signal is time division multiplexed with an SSB.

In a twelfth aspect, alone or in combination with one or more of the first through eleventh aspects, the first OAM node is in a connected state with respect to the second OAM node, and the first OAM node comprises an OAM transmitter and the second OAM node comprises an OAM receiver. In a thirteenth aspect, alone or in combination with one or more of the first through twelfth aspects, the first OAM node is in a connected state with respect to the second OAM node, and the first OAM node comprises an OAM receiver and the second OAM node comprises an OAM transmitter.

In a fourteenth aspect, alone or in combination with one or more of the first through thirteenth aspects, receiving the boresight direction alignment reference signal comprises receiving at least one repetition of a periodic reference signal. In a fifteenth aspect, alone or in combination with one or more of the first through fourteenth aspects, process 900 includes transmitting, to the first OAM node, a trigger indication, wherein receiving the boresight direction alignment reference signal comprises receiving the boresight direction alignment reference signal based at least in part on receiving the trigger indication. In a sixteenth aspect, alone or in combination with the fifteenth aspect, transmitting the trigger indication comprises transmitting at least one of a signal having a trigger sequence or a signal having a trigger message.

In a seventeenth aspect, alone or in combination with one or more of the first through sixteenth aspects, the boresight direction alignment reference signal is not OAM multiplexed with any other signals. In an eighteenth aspect, alone or in combination with one or more of the first through seventeenth aspects, receiving the boresight direction alignment reference signal comprises receiving the boresight direction alignment reference signal during an initial connection operation.

In a nineteenth aspect, alone or in combination with one or more of the first through eighteenth aspects, the first OAM node comprises an OAM transmitter, and process 900 further includes receiving, from the first OAM node, a boresight direction alignment reference signal configuration message that indicates configuration information associated with at least one of the boresight direction alignment reference signal or an additional boresight direction alignment reference signal. In a twentieth aspect, alone or in combination with the nineteenth aspect, the boresight direction alignment reference signal configuration message is not OAM multiplexed with any other signals. In a twenty-first aspect, alone or in combination with one or more of the nineteenth through twentieth aspects, the configuration information indicates a boresight direction alignment reference signal format, and receiving the boresight direction alignment reference signal comprises receiving the boresight direction alignment reference signal based at least in part on the boresight direction alignment reference signal format. In a twenty-second aspect, alone or in combination with the twenty-first aspect, the boresight direction alignment reference signal format indicates at least one of a time resource, a frequency resource, a repetition periodicity, or a boresight direction alignment reference signal sequence.

In a twenty-third aspect, alone or in combination with the twenty-second aspect, receiving the boresight direction alignment reference signal comprises receiving the boresight direction alignment reference signal using a single-carrier waveform, and the time resource comprises one or more time domain units. In a twenty-fourth aspect, alone or in combination with the twenty-second aspect, receiving the boresight direction alignment reference signal comprises receiving the boresight direction alignment reference signal using a multi-carrier waveform, wherein the time resource comprises one or more time domain units, and the frequency resource comprises one or more frequency domain units. In a twenty-fifth aspect, alone or in combination with the twenty-fourth aspect, the boresight direction alignment reference signal format indicates a start position, a length of the time resource, a length of the frequency resource, interval information associated with the time resource, and interval information associated with the frequency resource.

In a twenty-sixth aspect, alone or in combination with one or more of the nineteenth through twenty-fifth aspects, receiving the boresight direction alignment reference signal configuration message comprises receiving a configuration communication that includes the boresight direction alignment reference signal configuration message, the configuration communication comprising at least one of an RRC message, a MAC CE, or a layer 1 signal. In a twenty-seventh aspect, alone or in combination with one or more of the first through twenty-sixth aspects, transmitting the boresight direction alignment status report comprises transmitting a report communication that includes the boresight direction alignment status report, the report communication comprising at least one of an RRC message, a MAC CE, or a layer 1 signal.

In a twenty-eighth aspect, alone or in combination with one or more of the first through twenty-seventh aspects, the boresight direction alignment information indicates at least one of an inter-mode interference strength associated with the boresight direction alignment reference signal, a direction of arrival estimate, a direction of arrival estimate status, a direction alignment status, or a boresight direction alignment reference signal modification request. In a twenty-ninth aspect, alone or in combination with the twenty-eighth aspect, the boresight direction alignment status report indicates that further direction alignment is to be performed or that direction alignment is completed.

In a thirtieth aspect, alone or in combination with one or more of the twenty-eighth through twenty-ninth aspects, process 900 includes receiving a modified boresight direction alignment reference signal, wherein the modified boresight direction alignment reference signal comprises a modified format based at least in part on the boresight direction alignment reference signal modification request. In a thirty-first aspect, alone or in combination with one or more of the twenty-eighth through thirtieth aspects, the boresight direction alignment reference signal modification request indicates at least one of a modification of a boresight direction alignment reference signal transmission power, or a modification of a boresight direction alignment reference signal repetition periodicity.

In a thirty-second aspect, alone or in combination with one or more of the first through thirty-first aspects, process 900 includes transmitting, to the first OAM node, an additional boresight direction alignment reference signal. In a thirty-third aspect, alone or in combination with the thirty-second aspect, process 900 includes adjusting an orientation of an antenna panel of the first OAM node based at least in part on the additional boresight direction alignment reference signal. In a thirty-fourth aspect, alone or in combination with one or more of the thirty-second through thirty-third aspects, the first OAM node comprises an OAM transmitter, and process 900 further includes receiving, from the first OAM node, a boresight direction alignment reference signal configuration message that indicates configuration information associated with at least one of the boresight direction alignment reference signal or the additional boresight direction alignment reference signal.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
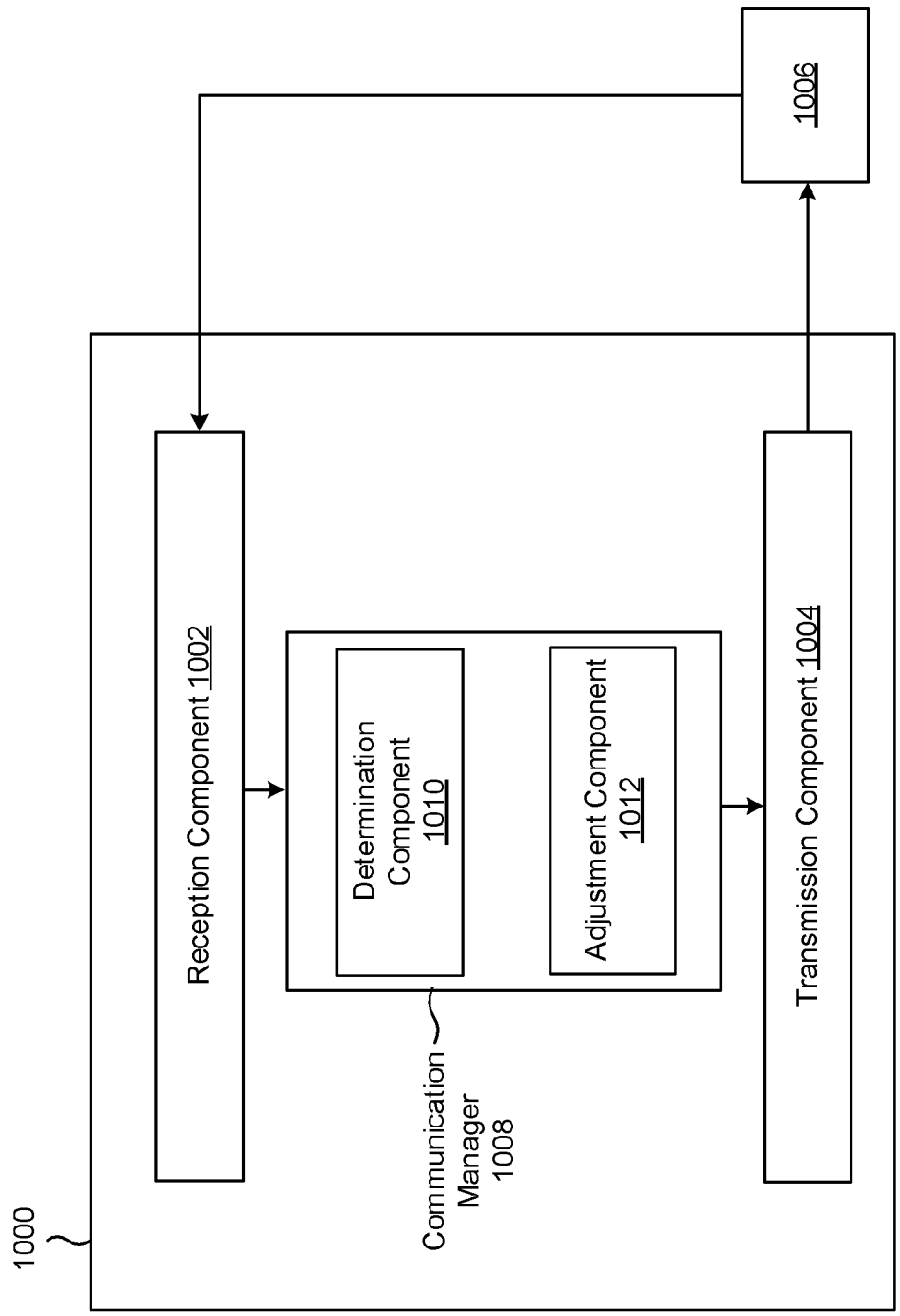
FIG. 10 is a diagram of an example apparatus for OAM multiplexing based communication, in accordance with the present disclosure.

FIG. 10 is a diagram of an example apparatus 1000 for wireless communication. The apparatus 1000 may be an OAM node (e.g., a first OAM node, a second OAM node, an OAM transmitter, and/or an OAM receiver), or an OAM node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008. The communication manager 1008 may be, or be similar to, the communication manager 140 and/or the communication manager 150, depicted in FIGS. 1 and 2. The communication manager 1008 may include one or more of a determination component 1010 and/or an adjustment component 1012, among other examples.

In some aspects, the apparatus 1000 may be configured to perform one or more operations described herein in connection with FIGS. 6 and 7. Additionally, or alternatively, the apparatus 1000 may be configured to perform one or more processes described herein, such as process 800 of FIG. 8, process 900 of FIG. 9, or a combination thereof. In some aspects, the apparatus 1000 and/or one or more components shown in FIG. 10 may include one or more components of the OAM node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the OAM node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the OAM node described in connection with FIG. 2. In some aspects, the transmission component 1004 may be co-located with the reception component 1002 in a transceiver.

The transmission component 1004 may transmit a boresight direction alignment reference signal to a second OAM node. The reception component 1002 may receive, from the second OAM node, a boresight direction alignment status report that indicates boresight direction alignment information based at least in part on the boresight direction alignment reference signal. The reception component 1002 may receive, from the second OAM node, a boresight misalignment estimation capability indication, wherein transmitting the boresight direction alignment reference signal comprises transmitting the boresight direction alignment reference signal using the one or more antenna elements based at least in part on the boresight misalignment estimation capability indication.

The transmission component 1004 may transmit, to the second OAM node, a ring configuration indication that indicates at least one of a radius of a ring of antenna elements that are used to transmit the boresight direction alignment reference signal, or a number of antenna elements in the ring of antenna elements.

The reception component 1002 may receive a configuration that indicates a set of radio resources corresponding to the boresight direction alignment reference signal.

The transmission component 1004 may transmit an activation message to activate a periodic reference signal or deactivate the periodic reference signal.

The reception component 1002 may receive, from the second OAM node, a trigger indication, wherein transmitting the boresight direction alignment reference signal comprises transmitting the boresight direction alignment reference signal based at least in part on receiving the trigger indication.

The communication manager 1008 and/or the determination component 1010 may determine a potential collision between the boresight direction alignment reference signal and an additional signal with respect to at least one of a time resource or a frequency resource. In some aspects, the communication manager 1008 may include one or more antennas, a modem, a controller/processor, a memory, or a combination thereof, of the OAM node described in connection with FIG. 2. In some aspects, the communication manager 1008 may include the reception component 1002 and/or the transmission component 1004. In some aspects, the determination component 1010 may include one or more antennas, a modem, a controller/processor, a memory, or a combination thereof, of the OAM node described in connection with FIG. 2. In some aspects, the determination component 1010 may include the reception component 1002 and/or the transmission component 1004.

The communication manager 1008 may mute the additional signal based at least in part on determining the potential collision.

The determination component 1010 may determine a potential collision between the boresight direction alignment reference signal and an additional signal with respect to at least one of a time resource or a frequency resource, wherein the additional signal has a priority level that is higher than a priority level of the boresight direction alignment reference signal. The communication manager 1008 and/or the transmission component 1004 may mute the boresight direction alignment reference signal based at least in part on determining the potential collision.

The transmission component 1004 may transmit a modified boresight direction alignment reference signal, wherein the modified boresight direction alignment reference signal comprises a modified format based at least in part on the boresight direction alignment reference signal modification request.

The reception component 1002 may receive, from the second OAM node, an additional boresight direction alignment reference signal.

The adjustment component 1012 may adjust an orientation of an antenna panel of the first OAM node based at least in part on the additional boresight direction alignment reference signal. The determination component 1010 may determine additional boresight direction alignment information based at least in part on the additional boresight direction alignment reference signal, wherein adjusting the orientation of the antenna panel of the first OAM node comprises adjusting the orientation of the antenna panel of the first OAM node based at least in part on the additional boresight direction alignment information.

The reception component 1002 may receive a boresight direction alignment reference signal from the first OAM node. The transmission component 1004 may transmit, to the first OAM node, a boresight direction alignment status report that indicates boresight direction alignment information based at least in part on the boresight direction alignment reference signal. The transmission component 1004 may transmit, to the first OAM node, a boresight misalignment estimation capability indication, wherein receiving the boresight direction alignment reference signal comprises receiving the boresight direction alignment reference signal using the one or more antenna elements based at least in part on the boresight misalignment estimation capability indication.

The reception component 1002 may receive, from the first OAM node, a ring configuration indication that indicates at least one of a radius of a ring of antenna elements that are used to transmit the boresight direction alignment reference signal, or a number of antenna elements in the ring of antenna elements.

The transmission component 1004 may transmit, to the first OAM node, a trigger indication, wherein receiving the boresight direction alignment reference signal comprises receiving the boresight direction alignment reference signal based at least in part on receiving the trigger indication.

The reception component 1002 may receive a modified boresight direction alignment reference signal, wherein the modified boresight direction alignment reference signal comprises a modified format based at least in part on the boresight direction alignment reference signal modification request.

The transmission component 1004 may transmit an additional boresight direction alignment reference signal. The adjustment component 1012 may adjust an orientation of an antenna panel of the first OAM node based at least in part on additional boresight direction alignment reference signal.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Aspect 1: A method of orbital angular momentum (OAM) multiplexing based communication performed by a first OAM node, comprising: transmitting a boresight direction alignment reference signal to a second OAM node; and receiving, from the second OAM node, a boresight direction alignment status report that indicates boresight direction alignment information based at least in part on the boresight direction alignment reference signal.

Aspect 2: The method of Aspect 1, wherein the boresight direction alignment reference signal comprises a circle center reference signal (CCRS), and wherein transmitting the boresight direction alignment reference signal comprises transmitting the boresight direction alignment reference signal using a circle center antenna element of a uniform circular array antenna panel.

Aspect 3: The method of either of Aspects 1 or 2, wherein transmitting the boresight direction alignment reference signal comprises transmitting the boresight direction alignment reference signal using one or more antenna elements of a uniform circular array antenna panel.

Aspect 4: The method of Aspect 3, wherein transmitting the boresight direction alignment reference signal comprises transmitting the boresight direction alignment reference signal using all of the antenna elements of the uniform circular array antenna panel.

Aspect 5: The method of either of Aspects 3 or 4, further comprising receiving, from the second OAM node, a boresight misalignment estimation capability indication, wherein transmitting the boresight direction alignment reference signal comprises transmitting the boresight direction alignment reference signal using the one or more antenna elements based at least in part on the boresight misalignment estimation capability indication.

Aspect 6: The method of any of Aspects 1-5, wherein the boresight direction alignment reference signal comprises a channel state information reference signal (CSI-RS) or a sounding reference signal (SRS).

Aspect 7: The method of Aspect 6, wherein the boresight direction alignment reference signal comprises a sidelink CSI-RS or a sidelink SRS.

Aspect 8: The method of any of Aspects 1-7, wherein transmitting the boresight direction alignment reference signal comprises beamforming the boresight direction alignment reference signal according to one or more OAM modes.

Aspect 9: The method of Aspect 8, wherein the one or more OAM modes comprise a plurality of OAM modes.

Aspect 10: The method of any of Aspects 1-9, further comprising transmitting, to the second OAM node, a ring configuration indication that indicates at least one of: a radius of a ring of antenna elements that are used to transmit the boresight direction alignment reference signal, or a number of antenna elements in the ring of antenna elements.

Aspect 11: The method of any of Aspects 1-10, further comprising receiving a configuration that indicates a set of radio resources corresponding to the boresight direction alignment reference signal.

Aspect 12: The method of Aspect 11, wherein the configuration comprises a channel state information reference signal resource indicator or a sounding reference signal index.

Aspect 13: The method of any of Aspects 1-12, wherein the boresight direction alignment status report is not OAM multiplexed with any other signals.

Aspect 14: The method of any of Aspects 1-13, wherein transmitting the boresight direction alignment reference signal comprises time division multiplexing the boresight direction alignment reference signal with a synchronization signal block.

Aspect 15: The method of any of Aspects 1-14, wherein the first OAM node is in a connected state with respect to the second OAM node, and wherein the first OAM node comprises an OAM transmitter and the second OAM node comprises an OAM receiver.

Aspect 16: The method of any of Aspects 1-14, wherein the first OAM node is in a connected state with respect to the second OAM node, and wherein the first OAM node comprises an OAM receiver and the second OAM node comprises an OAM transmitter.

Aspect 17: The method of any of Aspects 1-16, wherein transmitting the boresight direction alignment reference signal comprises transmitting at least one repetition of a periodic reference signal.

Aspect 18: The method of Aspect 17, further comprising transmitting an activation message to activate the periodic reference signal or deactivate the periodic reference signal.

Aspect 19: The method of any of Aspects 1-18, further comprising receiving, from the second OAM node, a trigger indication, wherein transmitting the boresight direction alignment reference signal comprises transmitting the boresight direction alignment reference signal based at least in part on receiving the trigger indication.

Aspect 20: The method of Aspect 19, wherein receiving the trigger indication comprises receiving at least one of a signal having a trigger sequence or a signal having a trigger message.

Aspect 21: The method of any of Aspects 1-20, wherein the boresight direction alignment reference signal is not OAM multiplexed with any other signals.

Aspect 22: The method of any of Aspects 1-21, further comprising: determining a potential collision between the boresight direction alignment reference signal and an additional signal with respect to at least one of a time resource or a frequency resource; and muting the additional signal based at least in part on determining the potential collision.

Aspect 23: The method of Aspect 1, further comprising: determining a potential collision between the boresight direction alignment reference signal and an additional signal with respect to at least one of a time resource or a frequency resource, wherein the additional signal has a priority level that is higher than a priority level of the boresight direction alignment reference signal; and muting the boresight direction alignment reference signal based at least in part on determining the potential collision.

Aspect 24: The method of any of Aspects 1-23, wherein transmitting the boresight direction alignment reference signal comprises transmitting the boresight direction alignment reference signal during an initial connection operation.

Aspect 25: The method of any of Aspects 1-24, wherein the first OAM node comprises an OAM transmitter, the method further comprising transmitting, to the second OAM node, a boresight direction alignment reference signal configuration message that indicates configuration information associated with at least one of the boresight direction alignment reference signal or an additional boresight direction alignment reference signal.

Aspect 26: The method of Aspect 25, wherein the boresight direction alignment reference signal configuration message is not OAM multiplexed with any other signals.

Aspect 27: The method of either of Aspects 25 or 26, wherein the configuration information indicates a boresight direction alignment reference signal format, and wherein transmitting the boresight direction alignment reference signal comprises transmitting the boresight direction alignment reference signal based at least in part on the boresight direction alignment reference signal format.

Aspect 28: The method of Aspect 27, wherein the boresight direction alignment reference signal format indicates at least one of: a time resource, a frequency resource, a repetition periodicity, or a boresight direction alignment reference signal sequence.

Aspect 29: The method of Aspect 28, wherein transmitting the boresight direction alignment reference signal comprises transmitting the boresight direction alignment reference signal using a single-carrier waveform, and wherein the time resource comprises one or more time domain units.

Aspect 30: The method of Aspect 28, wherein transmitting the boresight direction alignment reference signal comprises transmitting the boresight direction alignment reference signal using a multi-carrier waveform, wherein the time resource comprises one or more time domain units, and wherein the frequency resource comprises one or more frequency domain units.

Aspect 31: The method of Aspect 30, wherein the boresight direction alignment reference signal format indicates a start position, a length of the time resource, a length of the frequency resource, interval information associated with the time resource, and interval information associated with the frequency resource.

Aspect 32: The method of any of Aspects 25-31, wherein transmitting the boresight direction alignment reference signal configuration message comprises transmitting a configuration communication that includes the boresight direction alignment reference signal configuration message, the configuration communication comprising at least one of: a radio resource control message, a medium access control control element, or a layer 1 signal.

Aspect 33: The method of any of Aspects 1-32, wherein receiving the boresight direction alignment status report comprises receiving a report communication that includes the boresight direction alignment status report, the report communication comprising at least one of: a radio resource control message, a medium access control control element, or a layer 1 signal.

Aspect 34: The method of any of Aspects 1-33, wherein the boresight direction alignment information indicates at least one of: an inter-mode interference strength associated with the boresight direction alignment reference signal, a direction of arrival estimate, a direction of arrival estimate status, a direction alignment status, or a boresight direction alignment reference signal modification request.

Aspect 35: The method of Aspect 34, wherein the boresight direction alignment status report indicates that further direction alignment is to be performed or that direction alignment is completed.

Aspect 36: The method of either of Aspects 34 or 35, further comprising transmitting a modified boresight direction alignment reference signal, wherein the modified boresight direction alignment reference signal comprises a modified format based at least in part on the boresight direction alignment reference signal modification request.

Aspect 37: The method of any of Aspects 34-36, wherein the boresight direction alignment reference signal modification request indicates at least one of: a modification of a boresight direction alignment reference signal transmission power, or a modification of a boresight direction alignment reference signal repetition periodicity.

Aspect 38: The method of any of Aspects 1-37, further comprising receiving, from the second OAM node, an additional boresight direction alignment reference signal.

Aspect 39: The method of Aspect 38, further comprising adjusting an orientation of an antenna panel of the first OAM node based at least in part on the additional boresight direction alignment reference signal.

Aspect 40: The method of Aspect 39, further comprising determining additional boresight direction alignment information based at least in part on the additional boresight direction alignment reference signal, wherein adjusting the orientation of the antenna panel of the first OAM node comprises adjusting the orientation of the antenna panel of the first OAM node based at least in part on the additional boresight direction alignment information.

Aspect 41: The method of any of Aspects 38-40 wherein the first OAM node comprises an OAM transmitter, the method further comprising transmitting, to the second OAM node, a boresight direction alignment reference signal configuration message that indicates configuration information associated with at least one of the boresight direction alignment reference signal or the additional boresight direction alignment reference signal.

Aspect 42: A method of orbital angular momentum (OAM) multiplexing based communication associated with a first OAM node and a second OAM node, wherein the method is performed by the second OAM node and comprises: receiving a boresight direction alignment reference signal from the first OAM node; and transmitting, to the first OAM node, a boresight direction alignment status report that indicates boresight direction alignment information based at least in part on the boresight direction alignment reference signal.

Aspect 43: The method of Aspect 42, wherein the boresight direction alignment reference signal comprises a circle center reference signal (CCRS).

Aspect 44: The method of either of Aspects 42 or 43, wherein receiving the boresight direction alignment reference signal comprises receiving the boresight direction alignment reference signal using one or more antenna elements of a uniform circular array antenna panel.

Aspect 45: The method of Aspect 44, wherein receiving the boresight direction alignment reference signal comprises receiving the boresight direction alignment reference signal using all of the antenna elements of the uniform circular array antenna panel.

Aspect 46: The method of either of Aspects 44 or 45, further comprising transmitting, to the first OAM node, a boresight misalignment estimation capability indication, wherein receiving the boresight direction alignment reference signal comprises receiving the boresight direction alignment reference signal using the one or more antenna elements based at least in part on the boresight misalignment estimation capability indication.

Aspect 47: The method of any of Aspects 42-46, wherein the boresight direction alignment reference signal comprises a channel state information reference signal (CSI-RS) or a sounding reference signal (SRS).

Aspect 48: The method of Aspect 47, wherein the boresight direction alignment reference signal comprises a sidelink CSI-RS or a sidelink SRS.

Aspect 49: The method of any of Aspects 42-48, wherein receiving the boresight direction alignment reference signal comprises receiving a beamformed boresight direction alignment reference signal according to one or more OAM modes.

Aspect 50: The method of Aspect 49, wherein the one or more OAM modes comprise a plurality of OAM modes.

Aspect 51: The method of any of Aspects 42-50, further comprising receiving, from the first OAM node, a ring configuration indication that indicates at least one of: a radius of a ring of antenna elements that are used to transmit the boresight direction alignment reference signal, or a number of antenna elements in the ring of antenna elements.

Aspect 52: The method of any of Aspects 42-51, wherein the boresight direction alignment status report is not OAM multiplexed with any other signals.

Aspect 53: The method of any of Aspects 42-52, wherein the boresight direction alignment reference signal is time division multiplexed with a synchronization signal block.

Aspect 54: The method of any of Aspects 42-53, wherein the first OAM node is in a connected state with respect to the second OAM node, and wherein the first OAM node comprises an OAM transmitter and the second OAM node comprises an OAM receiver.

Aspect 55: The method of any of Aspects 42-53, wherein the first OAM node is in a connected state with respect to the second OAM node, and wherein the first OAM node comprises an OAM receiver and the second OAM node comprises an OAM transmitter.

Aspect 56: The method of any of Aspects 42-55, wherein receiving the boresight direction alignment reference signal comprises receiving at least one repetition of a periodic reference signal.

Aspect 57: The method of any of Aspects 42-56, further comprising transmitting, to the first OAM node, a trigger indication, wherein receiving the boresight direction alignment reference signal comprises receiving the boresight direction alignment reference signal based at least in part on receiving the trigger indication.

Aspect 58: The method of Aspect 57, wherein transmitting the trigger indication comprises transmitting at least one of a signal having a trigger sequence or a signal having a trigger message.

Aspect 59: The method of any of Aspects 42-58, wherein the boresight direction alignment reference signal is not OAM multiplexed with any other signals.

Aspect 60: The method of any of Aspects 42-59, wherein receiving the boresight direction alignment reference signal comprises receiving the boresight direction alignment reference signal during an initial connection operation.

Aspect 61: The method of any of Aspects 42-60, wherein the first OAM node comprises an OAM transmitter, the method further comprising receiving, from the first OAM node, a boresight direction alignment reference signal configuration message that indicates configuration information associated with at least one of the boresight direction alignment reference signal or an additional boresight direction alignment reference signal.

Aspect 62: The method of Aspect 61, wherein the boresight direction alignment reference signal configuration message is not OAM multiplexed with any other signals.

Aspect 63: The method either of Aspects 61 or 62, wherein the configuration information indicates a boresight direction alignment reference signal format, and wherein receiving the boresight direction alignment reference signal comprises receiving the boresight direction alignment reference signal based at least in part on the boresight direction alignment reference signal format.

Aspect 64: The method of Aspect 63, wherein the boresight direction alignment reference signal format indicates at least one of: a time resource, a frequency resource, a repetition periodicity, or a boresight direction alignment reference signal sequence.

Aspect 65: The method of Aspect 64, wherein receiving the boresight direction alignment reference signal comprises receiving the boresight direction alignment reference signal using a single-carrier waveform, and wherein the time resource comprises one or more time domain units.

Aspect 66: The method of Aspect 64, wherein receiving the boresight direction alignment reference signal comprises receiving the boresight direction alignment reference signal using a multi-carrier waveform, wherein the time resource comprises one or more time domain units, and wherein the frequency resource comprises one or more frequency domain units.

Aspect 67: The method of Aspect 66, wherein the boresight direction alignment reference signal format indicates a start position, a length of the time resource, a length of the frequency resource, interval information associated with the time resource, and interval information associated with the frequency resource.

Aspect 68: The method of any of Aspects 61-67, wherein receiving the boresight direction alignment reference signal configuration message comprises receiving a configuration communication that includes the boresight direction alignment reference signal configuration message, the configuration communication comprising at least one of: a radio resource control message, a medium access control control element, or a layer 1 signal.

Aspect 69: The method of any of Aspects 42-68, wherein transmitting the boresight direction alignment status report comprises transmitting a report communication that includes the boresight direction alignment status report, the report communication comprising at least one of: a radio resource control message, a medium access control control element, or a layer 1 signal.

Aspect 70: The method of any of Aspects 42-69, wherein the boresight direction alignment information indicates at least one of: an inter-mode interference strength associated with the boresight direction alignment reference signal, a direction of arrival estimate, a direction of arrival estimate status, a direction alignment status, or a boresight direction alignment reference signal modification request.

Aspect 71: The method of Aspect 70, wherein the boresight direction alignment status report indicates that further direction alignment is to be performed or that direction alignment is completed.

Aspect 72: The method of either of Aspects 70 or 71, further comprising receiving a modified boresight direction alignment reference signal, wherein the modified boresight direction alignment reference signal comprises a modified format based at least in part on the boresight direction alignment reference signal modification request.

Aspect 73: The method of any of Aspects 70-72, wherein the boresight direction alignment reference signal modification request indicates at least one of: a modification of a boresight direction alignment reference signal transmission power, or a modification of a boresight direction alignment reference signal repetition periodicity.

Aspect 74: The method of any of Aspects 42-73, further comprising transmitting, to the first OAM node, an additional boresight direction alignment reference signal.

Aspect 75: The method of Aspect 74, further comprising adjusting an orientation of an antenna panel of the first OAM node based at least in part on the additional boresight direction alignment reference signal.

Aspect 76: The method of either of Aspects 74 or 75, wherein the first OAM node comprises an OAM transmitter, the method further comprising receiving, from the first OAM node, a boresight direction alignment reference signal configuration message that indicates configuration information associated with at least one of the boresight direction alignment reference signal or the additional boresight direction alignment reference signal.

Aspect 77: An apparatus for wireless communication at a device, comprising a processor; memory coupled with the processor; and instructions stored in the memory and executable by the processor to cause the apparatus to perform the method of one or more of Aspects 1-41.

Aspect 78: A device for wireless communication, comprising a memory and one or more processors coupled to the memory, the one or more processors configured to perform the method of one or more of Aspects 1-41.

Aspect 79: An apparatus for wireless communication, comprising at least one means for performing the method of one or more of Aspects 1-41.

Aspect 80: A non-transitory computer-readable medium storing code for wireless communication, the code comprising instructions executable by a processor to perform the method of one or more of Aspects 1-41.

Aspect 81: A non-transitory computer-readable medium storing a set of instructions for wireless communication, the set of instructions comprising one or more instructions that, when executed by one or more processors of a device, cause the device to perform the method of one or more of Aspects 1-41.

Aspect 82: An apparatus for wireless communication at a device, comprising a processor; memory coupled with the processor; and instructions stored in the memory and executable by the processor to cause the apparatus to perform the method of one or more of Aspects 42-76.

Aspect 83: A device for wireless communication, comprising a memory and one or more processors coupled to the memory, the one or more processors configured to perform the method of one or more of Aspects 42-76.

Aspect 84: An apparatus for wireless communication, comprising at least one means for performing the method of one or more of Aspects 42-76.

Aspect 85: A non-transitory computer-readable medium storing code for wireless communication, the code comprising instructions executable by a processor to perform the method of one or more of Aspects 42-76.

Aspect 86: A non-transitory computer-readable medium storing a set of instructions for wireless communication, the set of instructions comprising one or more instructions that, when executed by one or more processors of a device, cause the device to perform the method of one or more of Aspects 42-76.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first orbital angular momentum (OAM) node for wireless communication, comprising:
a memory; and
one or more processors, coupled to the memory, configured to:
transmit a boresight direction alignment reference signal to a second OAM node; and
receive, from the second OAM node, a boresight direction alignment status report that indicates boresight direction alignment information based at least in part on the boresight direction alignment reference signal.

2. The first OAM node of claim 1, wherein the boresight direction alignment reference signal comprises a circle center reference signal (CCRS), and wherein transmitting the boresight direction alignment reference signal comprises transmitting the boresight direction alignment reference signal using a circle center antenna element of a uniform circular array antenna panel.

3. The first OAM node of claim 1, wherein the one or more processors, to transmit the boresight direction alignment reference signal, are configured to transmit the boresight direction alignment reference signal using one or more antenna elements of a uniform circular array antenna panel.

4. The first OAM node of claim 3, wherein the one or more processors are further configured to receive, from the second OAM node, a boresight misalignment estimation capability indication, wherein transmitting the boresight direction alignment reference signal comprises transmitting the boresight direction alignment reference signal using the one or more antenna elements based at least in part on the boresight misalignment estimation capability indication.

5. The first OAM node of claim 1, wherein the boresight direction alignment reference signal comprises a channel state information reference signal (CSI-RS) or a sounding reference signal (SRS).

6. The first OAM node of claim 1, wherein the one or more processors, to transmit the boresight direction alignment reference signal, are configured to beamform the boresight direction alignment reference signal according to one or more OAM modes.

7. The first OAM node of claim 1, wherein the one or more processors are further configured to transmit, to the second OAM node, a ring configuration indication that indicates at least one of:
a radius of a ring of antenna elements that are used to transmit the boresight direction alignment reference signal, or
a number of antenna elements in the ring of antenna elements.

8. The first OAM node of claim 1, wherein the one or more processors are further configured to receive a configuration that indicates a set of radio resources corresponding to the boresight direction alignment reference signal.

9. The first OAM node of claim 1, wherein the one or more processors, to transmit the boresight direction alignment reference signal, are configured to time division multiplex the boresight direction alignment reference signal with a synchronization signal block.

10. The first OAM node of claim 1, wherein the first OAM node is in a connected state with respect to the second OAM node, and wherein the first OAM node comprises an OAM transmitter and the second OAM node comprises an OAM receiver.

11. The first OAM node of claim 1, wherein the first OAM node is in a connected state with respect to the second OAM node, and wherein the first OAM node comprises an OAM receiver and the second OAM node comprises an OAM transmitter.

12. The first OAM node of claim 1, wherein the one or more processors, to transmit the boresight direction alignment reference signal, are configured to transmit at least one repetition of a periodic reference signal.

13. The first OAM node of claim 1, wherein the one or more processors are further configured to receive, from the second OAM node, a trigger indication, wherein transmitting the boresight direction alignment reference signal comprises transmitting the boresight direction alignment reference signal based at least in part on receiving the trigger indication.

14. The first OAM node of claim 1, wherein at least one of the boresight direction alignment status report, the boresight direction alignment reference signal, or a boresight direction alignment reference signal configuration message is not OAM multiplexed with any other signals.

15. The first OAM node of claim 1, wherein the one or more processors are further configured to:
determine a potential collision between the boresight direction alignment reference signal and an additional signal with respect to at least one of a time resource or a frequency resource; and
mute the additional signal based at least in part on determining the potential collision, or
mute the boresight direction alignment reference signal based at least in part on determining the potential collision and determining that the additional signal has a priority level that is higher than a priority level of the boresight direction alignment reference signal.

16. The first OAM node of claim 1, wherein the one or more processors, to transmit the boresight direction alignment reference signal, are configured to transmit the boresight direction alignment reference signal during an initial connection operation.

17. The first OAM node of claim 1, wherein the first OAM node comprises an OAM transmitter, wherein the one or more processors are further configured to transmit, to the second OAM node, a boresight direction alignment reference signal configuration message that indicates configuration information associated with at least one of the boresight direction alignment reference signal or an additional boresight direction alignment reference signal, wherein the configuration information indicates a boresight direction alignment reference signal format, and wherein the one or more processors, to transmit the boresight direction alignment reference signal, are configured to transmit the boresight direction alignment reference signal based at least in part on the boresight direction alignment reference signal format.

18. The first OAM node of claim 17, wherein the boresight direction alignment reference signal format indicates a time resource and a frequency resource, and wherein the one or more processors, to transmit the boresight direction alignment reference signal, are configured to:
transmit the boresight direction alignment reference signal using a single-carrier waveform, and wherein the time resource comprises one or more time domain units; or
transmit the boresight direction alignment reference signal using a multi-carrier waveform, wherein the time resource comprises one or more time domain units, and wherein the frequency resource comprises one or more frequency domain units.

19. The first OAM node of claim 17, wherein the boresight direction alignment reference signal format indicates a start position, a length of a time resource, a length of a frequency resource, interval information associated with the time resource, and interval information associated with the frequency resource.

20. The first OAM node of claim 1, wherein the boresight direction alignment status report indicates that further direction alignment is to be performed or that direction alignment is completed, and wherein the boresight direction alignment information indicates at least one of:
an inter-mode interference strength associated with the boresight direction alignment reference signal,
a direction of arrival estimate,
a direction of arrival estimate status,
a direction alignment status, or
a boresight direction alignment reference signal modification request.

21. The first OAM node of claim 20, wherein the one or more processors are further configured to transmit a modified boresight direction alignment reference signal, wherein the modified boresight direction alignment reference signal comprises a modified format based at least in part on the boresight direction alignment reference signal modification request.

22. The first OAM node of claim 20, wherein the boresight direction alignment reference signal modification request indicates at least one of:
   a modification of a boresight direction alignment reference signal transmission power, or
   a modification of a boresight direction alignment reference signal repetition periodicity.

23. The first OAM node of claim 1, wherein the one or more processors are further configured to:
   receive, from the second OAM node, an additional boresight direction alignment reference signal; and
   adjust an orientation of an antenna panel of the first OAM node based at least in part on the additional boresight direction alignment reference signal.

24. The first OAM node of claim 23, wherein the first OAM node comprises an OAM transmitter, and wherein the one or more processors are further configured to transmit, to the second OAM node, a boresight direction alignment reference signal configuration message that indicates configuration information associated with at least one of the boresight direction alignment reference signal or the additional boresight direction alignment reference signal.

25. A second orbital angular momentum (OAM) node, of a first OAM node and a second OAM node, for OAM based multiplexing based communication, comprising:
   a memory; and
   one or more processors, coupled to the memory, configured to:
      receive a boresight direction alignment reference signal from the first OAM node; and
      transmit, to the first OAM node, a boresight direction alignment status report that indicates boresight direction alignment information based at least in part on the boresight direction alignment reference signal.

26. The second OAM node of claim 25, wherein the boresight direction alignment reference signal comprises a circle center reference signal (CCRS).

27. A method of orbital angular momentum (OAM) multiplexing based communication performed by a first OAM node, comprising:
   transmitting a boresight direction alignment reference signal to a second OAM node; and
   receiving, from the second OAM node, a boresight direction alignment status report that indicates boresight direction alignment information based at least in part on the boresight direction alignment reference signal.

28. The method of claim 27, wherein the boresight direction alignment reference signal comprises a circle center reference signal (CCRS), and wherein transmitting the boresight direction alignment reference signal comprises transmitting the boresight direction alignment reference signal using a circle center antenna element of a uniform circular array antenna panel.

29. A method of orbital angular momentum (OAM) multiplexing based communication associated with a first OAM node and a second OAM node, wherein the method is performed by the second OAM node and comprises:
   receiving a boresight direction alignment reference signal from the first OAM node; and
   transmitting, to the first OAM node, a boresight direction alignment status report that indicates boresight direction alignment information based at least in part on the boresight direction alignment reference signal.

30. The method of claim 29, wherein the boresight direction alignment reference signal comprises a circle center reference signal (CCRS).

* * * * *